United States Patent
Hauville et al.

(10) Patent No.: US 12,468,273 B2
(45) Date of Patent: Nov. 11, 2025

(54) MOBILE AIR-FILTERING PATIENT ISOLATION SYSTEM, MOBILE AIR-FILTERING LABORATORY ISOLATION SYSTEM, AND MOBILE ROOM AIR-FILTERING SYSTEM, INCLUDING IMPROVED AIR FILTRATION UNIT

(71) Applicant: FIPAK Research And Development Company, Rowley, MA (US)

(72) Inventors: Stephane Hauville, Byfield, MA (US); Antoine Hauville, La Londe (FR); Cédric Herry, Val de Reuil (FR)

(73) Assignee: FIPAK Research And Development Company, Rowley, MA (US)

( * ) Notice: Subject to any disclaimer, the term of this patent is extended or adjusted under 35 U.S.C. 154(b) by 0 days.

(21) Appl. No.: 17/699,618

(22) Filed: Mar. 21, 2022

(65) Prior Publication Data
US 2022/0206446 A1    Jun. 30, 2022

Related U.S. Application Data

(63) Continuation of application No. 17/474,445, filed on Sep. 14, 2021, which is a continuation of application
(Continued)

(51) Int. Cl.
| | |
|---|---|
| G05B 15/02 | (2006.01) |
| B08B 15/00 | (2006.01) |
| F24F 3/16 | (2021.01) |
| F24F 7/06 | (2006.01) |
| F24F 11/77 | (2018.01) |

(Continued)

(52) U.S. Cl.
CPC .............. *G05B 15/02* (2013.01); *B08B 15/00* (2013.01); *F24F 3/16* (2013.01); *F24F 7/06* (2013.01); *F24F 11/77* (2018.01); *H04W 4/70* (2018.02); *F24F 11/32* (2018.01); *F24F 11/39* (2018.01); *F24F 11/52* (2018.01); *F24F 2221/14* (2013.01); *Y02B 30/70* (2013.01); *Y10S 55/34* (2013.01)

(58) Field of Classification Search
CPC ..... B08B 15/00; F24F 3/16; F24F 7/06; F24F 11/39; F24F 11/52; F24F 11/77
USPC .... 55/385.2, 356, DIG. 34; 454/187, 49, 63; 96/127, 140, 417, 397, 424
See application file for complete search history.

(56) References Cited

U.S. PATENT DOCUMENTS

| | | |
|---|---|---|
| 2,243,916 A | 6/1941 | Mueller |
| D159,487 S | 8/1950 | Jaye |

(Continued)

FOREIGN PATENT DOCUMENTS

| | | |
|---|---|---|
| CN | 1727783 | 2/2006 |
| CN | 101761944 | 6/2010 |

(Continued)

OTHER PUBLICATIONS

English Machine Translation of Chinese Patent CN 204861601 U.*

*Primary Examiner* — Dung H Bui
(74) *Attorney, Agent, or Firm* — Pandiscio & Pandiscio

(57) ABSTRACT

A mobile air-filtering isolation system, the system including a base; a frame extending upwardly from the base; an air filtration unit mounted to the frame; and at least one flexible curtain extending downward from the air filtration unit, whereby to form an enclosure.

15 Claims, 30 Drawing Sheets

Related U.S. Application Data

No. 16/736,104, filed on Jan. 7, 2020, now Pat. No. 11,119,460, which is a continuation of application No. 15/640,725, filed on Jul. 3, 2017, now Pat. No. 10,528,014, which is a continuation of application No. 14/635,206, filed on Mar. 2, 2015, now Pat. No. 9,696,703, which is a continuation-in-part of application No. 14/281,416, filed on May 19, 2014, now Pat. No. 8,986,427.

(60) Provisional application No. 61/824,997, filed on May 18, 2013, provisional application No. 61/946,292, filed on Feb. 28, 2014, provisional application No. 63/163,238, filed on Mar. 19, 2021.

(51) Int. Cl.
*H04W 4/70* (2018.01)
*F24F 11/32* (2018.01)
*F24F 11/39* (2018.01)
*F24F 11/52* (2018.01)

(56) References Cited

U.S. PATENT DOCUMENTS

| | | | |
|---|---|---|---|
| 3,357,763 A | 12/1967 | Toper | |
| D211,790 S | 7/1968 | Murray | |
| 3,858,570 A * | 1/1975 | Beld | A61G 11/008 |
| | | | 392/416 |
| 3,935,803 A * | 2/1976 | Bush | A61G 10/02 |
| | | | 454/189 |
| D285,830 S | 9/1986 | Daily et al. | |
| D288,519 S | 3/1987 | Taylor | |
| 4,713,099 A | 12/1987 | Schroeder | |
| 4,765,352 A * | 8/1988 | Strieter | B08B 15/026 |
| | | | 135/900 |
| D325,254 S | 4/1992 | Ruuskanen | |
| 5,443,625 A | 8/1995 | Schaffhausen | |
| D373,348 S | 9/1996 | Carlson | |
| 5,641,343 A * | 6/1997 | Frey | B01D 46/521 |
| | | | 55/330 |
| 5,711,785 A | 1/1998 | Maxwell | |
| D396,097 S | 7/1998 | Thomas et al. | |
| 5,817,002 A * | 10/1998 | Donnelly | G05D 27/02 |
| | | | 600/22 |
| 5,832,919 A | 11/1998 | Kano et al. | |
| 5,833,727 A * | 11/1998 | Skarsten | B01D 46/88 |
| | | | 55/385.2 |
| 5,837,020 A * | 11/1998 | Cartellone | B01D 46/42 |
| | | | 55/459.3 |
| D402,361 S | 12/1998 | Nepsund et al. | |
| 5,924,469 A * | 7/1999 | Whittemore | E04G 21/30 |
| | | | 248/200.1 |
| 6,123,321 A * | 9/2000 | Miller | A47D 13/065 |
| | | | 256/25 |
| 6,213,935 B1 * | 4/2001 | Mackin | A61G 11/00 |
| | | | 600/22 |
| 6,267,793 B1 | 7/2001 | Gomez et al. | |
| 6,284,011 B1 | 9/2001 | Chiang et al. | |
| 6,321,034 B2 | 11/2001 | Jones-Lawlor et al. | |
| 6,321,764 B1 | 11/2001 | Gauger et al. | |
| 6,321,823 B1 * | 11/2001 | Whittemore | A47H 21/00 |
| | | | 248/200.1 |
| D453,822 S | 2/2002 | Meeks et al. | |
| 6,428,592 B1 | 8/2002 | Chase et al. | |
| 6,494,199 B1 | 12/2002 | Zia et al. | |
| 6,554,880 B1 | 4/2003 | Northcutt | |
| 6,632,260 B1 * | 10/2003 | Siemers | B08B 15/023 |
| | | | 454/189 |
| D483,844 S | 12/2003 | Yamamoto et al. | |
| D486,485 S | 2/2004 | Dodson | |
| 6,797,028 B2 | 9/2004 | Duffy | |
| D502,254 S | 2/2005 | Smith et al. | |
| 6,869,458 B2 * | 3/2005 | Iijima | F24F 3/163 |
| | | | 55/318 |
| 6,916,238 B2 * | 7/2005 | Korman | F24F 3/163 |
| | | | 55/385.2 |
| 7,108,040 B2 * | 9/2006 | Whittemore | A47H 21/00 |
| | | | 160/368.1 |
| D534,262 S | 12/2006 | Rho | |
| 7,244,294 B2 | 7/2007 | Kates | |
| 7,272,525 B2 | 9/2007 | Bennett et al. | |
| D558,317 S | 12/2007 | Francisquini | |
| 7,338,358 B2 | 3/2008 | Kim et al. | |
| 7,462,220 B2 | 12/2008 | Farmer | |
| 7,537,647 B2 * | 5/2009 | Adair | B01D 45/06 |
| | | | 55/467 |
| 7,749,303 B2 | 7/2010 | Wright | |
| 7,753,977 B2 * | 7/2010 | Lyons | B01D 46/62 |
| | | | 55/467 |
| 7,811,365 B2 | 10/2010 | Grzonka et al. | |
| 7,875,099 B2 | 1/2011 | Abraham et al. | |
| D636,857 S | 4/2011 | Jacques et al. | |
| D638,529 S | 5/2011 | Gedcke et al. | |
| D645,130 S | 9/2011 | Goldstein et al. | |
| 8,057,565 B2 | 11/2011 | Yabu et al. | |
| 8,070,139 B2 | 12/2011 | Nassirpour et al. | |
| D653,320 S | 1/2012 | Watanabe et al. | |
| 8,101,000 B2 | 1/2012 | Uhlik et al. | |
| 8,150,387 B2 | 4/2012 | Klein et al. | |
| 8,152,607 B2 * | 4/2012 | Carrig | B08B 15/02 |
| | | | 454/49 |
| D661,696 S | 6/2012 | Takada | |
| 8,282,002 B2 | 10/2012 | Shams | |
| D680,636 S | 4/2013 | Ching | |
| 8,444,747 B2 * | 5/2013 | Kristensson | F24F 5/0042 |
| | | | 128/202.13 |
| D689,995 S | 9/2013 | Dios | |
| 8,574,331 B2 * | 11/2013 | Bangera | A62B 23/025 |
| | | | 55/DIG. 35 |
| 8,657,936 B2 | 2/2014 | Sullivan | |
| 8,686,871 B2 | 4/2014 | Jensen et al. | |
| 8,861,924 B2 | 10/2014 | Meads et al. | |
| 8,870,057 B2 | 10/2014 | Campbell et al. | |
| 8,936,194 B1 | 1/2015 | Welch et al. | |
| 8,986,427 B2 * | 3/2015 | Hauville | F24F 3/16 |
| | | | 96/417 |
| 9,320,996 B1 | 4/2016 | Baldwin, Jr. | |
| 9,696,703 B2 * | 7/2017 | Hauville | B08B 15/00 |
| 10,376,827 B2 * | 8/2019 | Cole | B01D 46/0086 |
| 10,528,014 B2 * | 1/2020 | Hauville | F24F 11/77 |
| 10,544,950 B2 * | 1/2020 | McFadden | F24F 3/163 |
| 10,610,817 B2 * | 4/2020 | Swan | B01D 46/0043 |
| 11,119,460 B2 * | 9/2021 | Hauville | F24F 3/16 |
| 11,690,460 B2 * | 7/2023 | Wennerstrom | B01D 46/0032 |
| | | | 128/205.26 |
| 12,055,318 B2 * | 8/2024 | Denson | B01D 46/645 |
| 2001/0049927 A1 | 12/2001 | Toepel | |
| 2002/0155049 A1 | 10/2002 | Hong et al. | |
| 2003/0037812 A1 * | 2/2003 | Stewart | E04H 1/1277 |
| | | | 135/96 |
| 2004/0144414 A1 * | 7/2004 | Seo | E04H 15/32 |
| | | | 135/131 |
| 2005/0050804 A1 | 3/2005 | Weidner | |
| 2005/0077015 A1 * | 4/2005 | Melino | E04G 21/243 |
| | | | 160/135 |
| 2005/0278047 A1 | 12/2005 | Ahmed | |
| 2006/0020159 A1 | 1/2006 | Ellen | |
| 2006/0174596 A1 | 8/2006 | Choi et al. | |
| 2006/0277873 A1 | 12/2006 | Lyons et al. | |
| 2007/0032225 A1 | 2/2007 | Konicek et al. | |
| 2007/0144119 A1 | 6/2007 | Bauer | |
| 2007/0275651 A1 | 11/2007 | Palmer | |
| 2009/0044703 A1 | 2/2009 | Bias et al. | |
| 2009/0075582 A1 | 3/2009 | Wilkerson | |
| 2009/0229469 A1 | 9/2009 | Campbell et al. | |
| 2009/0311951 A1 | 12/2009 | Walkinshaw | |
| 2010/0174599 A1 | 7/2010 | Rosenblatt et al. | |
| 2010/0294134 A1 | 11/2010 | Yokomizo et al. | |
| 2010/0324741 A1 | 12/2010 | House et al. | |
| 2011/0232481 A1 | 9/2011 | Worrilow | |

(56) References Cited

U.S. PATENT DOCUMENTS

| | | |
|---|---|---|
| 2012/0064923 A1 | 3/2012 | Imes et al. |
| 2012/0087087 A1 | 4/2012 | Nicolai et al. |
| 2012/0266889 A1 | 10/2012 | Roberts |
| 2013/0073431 A1 | 3/2013 | Suro et al. |
| 2013/0223279 A1 | 8/2013 | Tinnakornsrisuphap et al. |
| 2013/0268127 A1 | 10/2013 | Casilli et al. |
| 2013/0275313 A1 | 10/2013 | Vahid |
| 2013/0333570 A1* | 12/2013 | Kamperschroer ...... F24F 8/158 96/108 |
| 2014/0018940 A1 | 1/2014 | Casilli |
| 2014/0085309 A1 | 3/2014 | Czapar |
| 2014/0303755 A1 | 10/2014 | Landgraf et al. |
| 2015/0290572 A1 | 10/2015 | Stoner, Jr. et al. |
| 2016/0074801 A1 | 3/2016 | Francis et al. |

FOREIGN PATENT DOCUMENTS

| | | | |
|---|---|---|---|
| CN | 103105195 | 5/2013 | |
| CN | 202902475 | 4/2014 | |
| CN | 104040530 | 9/2014 | |
| CN | 204861601 U * | 12/2015 | ............. A45B 11/00 |
| CN | 207299238 U * | 5/2018 | ................ F24F 1/02 |
| CN | 212234793 U * | 12/2020 | ............... A61F 2/01 |
| EP | 2101118 | 9/2009 | |
| EP | 2199695 | 6/2010 | |
| EP | 2246637 | 11/2010 | |
| JP | 50-50250 | 5/1975 | |
| JP | S57153139 | 9/1982 | |
| JP | 58-117935 | 7/1983 | |
| JP | 5-15728 | 1/1993 | |
| JP | H0565618 | 8/1993 | |
| JP | 9-38449 | 2/1997 | |
| JP | 2000-18698 | 1/2000 | |
| JP | 2000-81231 | 3/2000 | |
| JP | 2001-12777 | 1/2001 | |
| JP | 2004-20035 | 1/2004 | |
| JP | 2008-73642 | 4/2008 | |
| JP | 2009-45225 | 3/2009 | |
| JP | 2009-119373 | 6/2009 | |
| JP | 2011-052851 | 3/2011 | |
| KR | 2008 0103814 | 11/2008 | |
| KR | 2010 0078196 | 7/2010 | |
| WO | WO 2006/135758 | 12/2006 | |
| WO | WO 2011/024424 | 3/2011 | |
| WO | WO 2011/119691 | 9/2011 | |
| WO | WO 2012/167280 | 12/2012 | |
| WO | WO 2024/102056 | 5/2024 | |

* cited by examiner

MOBILE AIR-FILTERING PATIENT ISOLATION SYSTEM, MOBILE AIR-FILTERING LABORATORY ISOLATION SYSTEM, AND MOBILE ROOM AIR-FILTERING SYSTEM, INCLUDING IMPROVED AIR FILTRATION UNIT

REFERENCE TO PENDING PRIOR PATENT APPLICATION

This patent application:
(i) is a continuation of prior U.S. patent application Ser. No. 17/474,445, filed Sep. 14, 2021 by FIPAK Research And Development Company for METHOD AND APPARATUS FOR ENSURING AIR QUALITY IN A BUILDING, INCLUDING METHOD AND APPARATUS FOR CONTROLLING A WORKING DEVICE USING A HANDHELD UNIT HAVING SCANNING, NETWORKING, DISPLAY AND INPUT CAPABILITY, now U.S. Pat. No. 11,703,816, which patent application, in turn, is a continuation of prior U.S. patent application Ser. No. 16/736,104, filed Jan. 7, 2020 by FIPAK Research And Development Company for METHOD AND APPARATUS FOR ENSURING AIR QUALITY IN A BUILDING, INCLUDING METHOD AND APPARATUS FOR CONTROLLING A WORKING DEVICE USING A HANDHELD UNIT HAVING SCANNING, NETWORKING, DISPLAY AND INPUT CAPABILITY, now U.S. Pat. No. 11,119,460, which patent application, in turn, is a continuation of prior U.S. patent application Ser. No. 15/640,725, filed Jul. 3, 2017 by FIPAK Research And Development Company for METHOD AND APPARATUS FOR ENSURING AIR QUALITY IN A BUILDING, INCLUDING METHOD AND APPARATUS FOR CONTROLLING A WORKING DEVICE USING A HANDHELD UNIT HAVING SCANNING, NETWORKING, DISPLAY AND INPUT CAPABILITY, now U.S. Pat. No. 10,528,014, which patent application, in turn, is a continuation of prior U.S. patent application Ser. No. 14/635,206, filed Mar. 2, 2015 by FIPAK Research And Development Company for METHOD AND APPARATUS FOR ENSURING AIR QUALITY IN A BUILDING, INCLUDING METHOD AND APPARATUS FOR CONTROLLING A WORKING DEVICE USING A HANDHELD UNIT HAVING SCANNING, NETWORKING, DISPLAY AND INPUT CAPABILITY, now U.S. Pat. No. 9,696,703, which patent application, in turn,
(A) is a continuation-in-part of prior U.S. patent application Ser. No. 14/281,416, filed May 19, 2014 by FIPAK Research And Development Company and Stephan Hauville et al. for METHOD AND APPARATUS FOR MONITORING AND ENSURING AIR QUALITY IN A BUILDING, now U.S. Pat. No. 8,986,427, which patent application, in turn, claims benefit of prior U.S. Provisional Patent Application Ser. No. 61/824,997, filed May 18, 2013 by FIPAK Research And Development Company and Stephan Hauville et al. for METHOD AND APPARATUS FOR HANDLING AIR IN A LABORATORY BUILDING; and
(B) claims benefit of prior U.S. Provisional Patent Application Ser. No. 61/946,292, filed Feb. 28, 2014 by FIPAK Research And Development Company and Stephan Hauville et al. for METHOD AND APPARATUS FOR HANDLING AIR IN A LABORATORY BUILDING; and
(ii) claims benefit of prior U.S. Provisional Patent Application Ser. No. 63/163,238, filed Mar. 19, 2021 by FIPAK Research And Development Company and Stephane Hauville et al. for MOBILE AIR-FILTERING PATIENT ISOLATION SYSTEM, MOBILE AIR-FILTERING BENCHTOP ISOLATION SYSTEM, AND MOBILE ROOM AIR-FILTERING SYSTEM, INCLUDING IMPROVED AIR FILTRATION UNIT.

The eight (8) above-identified patent application is hereby incorporated herein by reference.

FIELD OF THE INVENTION

This invention relates to air-filtering systems in general, and more particularly to novel air-filtering patient isolation systems, novel air-filtering laboratory isolation systems, and novel room air-filtering systems, and including improved air filtration units.

BACKGROUND OF THE INVENTION

The world is currently in the midst of a global pandemic due to the outbreak of the SARS-CoV-2 virus. This deadly, highly contagious virus is thought to spread primarily through airborne person-to-person communication. As a result, it is generally desirable, to the extent possible, to isolate people infected with the virus from people who are not yet infected with the virus. Social distancing, the use of masks, and frequent hand-sanitizing have proven to be effective techniques for reducing the spread of the virus.

In many cases, patients suffering from the SARS-CoV-2 virus must be hospitalized. This presents a significant problem, since the infected patients pose a substantial risk to medical personnel, other patients, etc. At the same time, the infected patients generally require substantial care from medical personnel and substantial access to sophisticated medical equipment, e.g., ventilators, etc. Efforts have been made to isolate these infected patients in special sections of the hospital (e.g., negative pressure rooms which constantly purge the room air), however, these special sections of the hospital are typically located remote from the point at which the virus diagnosis is made (e.g., an emergency room), and these special sections of the hospital have limited capacity. Thus, when a patient is diagnosed with the virus, the patient must first be moved from the location they are at when diagnosed (e.g., an emergency room) to a special section of the hospital (e.g., a negative pressure room), and this transport is ideally conducted with the patient placed in a full enclosure "suit" to prevent the virus from being spread during patient transport. This makes patient transport awkward and time-consuming at best. Furthermore, this assumes that a bed is available for the infected patient in the special section of the hospital (e.g., a negative pressure room), which in many cases is not true, particularly when there is a peak in the number of virus cases. As a result, many patients must be accommodated in non-isolation sections of the hospital (e.g., in an ordinary hospital room or ward). Unfortunately, this makes it very difficult to isolate the infected patients from medical personnel, non-infected patients, etc.

It would, therefore, be desirable to provide an air-filtering patient isolation system which could be readily deployed about an ordinary hospital bed in an ordinary hospital room or ward so that an infected patient could be safely isolated from their surroundings, whereby to protect medical personnel, non-infected patients, etc. Ideally, these air-filtering patient isolation systems should be mobile so that they can be rapidly deployed throughout a hospital, particularly when the hospital is treating a rapid influx of infected patients.

In addition to the foregoing, in many situations a patient may need to be treated with a high-risk medication which can become air-borne and which can pose a risk to medical personnel, other patients, etc. if the high-risk medication comes into contact with medical personnel, other patients, etc.

It would, therefore, be desirable to provide an air-filtering patient isolation system which can be readily deployed about an ordinary hospital bed in an ordinary hospital room or ward so that the patient being treated with such a high-risk medication could be safely isolated from their surroundings, whereby to protect medical personnel, other patients, etc. from exposure to the high-risk medication. Ideally, these air-filtering patient isolation systems should be mobile so that they can be rapidly deployed throughout a hospital.

In addition to the foregoing, in many situations hazardous materials (e.g., chemicals, biologics, etc.) must be handled by personnel. By way of example but not limitation, scientists frequently need to handle hazardous chemicals and/or biologics in a laboratory setting. In this circumstance, it is common to provide isolation chambers (e.g., fumehoods) within the laboratory, with the hazardous materials being handled within the fumehoods. Such fumehoods typically comprise ducted fumehoods and ductless fumehoods. Ducted fumehoods are expensive, since they require ducting to be installed within a building, and since they vent the air from within the fumehood to the outside environment, which can waste the "energy" contained in cooled air during the summer and the "energy" contained in heated air during the winter. Ductless fumehoods are more economical, since they eliminate the need for ducting, and since they vent the air from within the fumehood back into the laboratory (i.e., after appropriate treatment), thereby conserving the "energy" contained in cooled air during the summer and conserving the "energy" contained in heated air during the winter. However, such ductless fumehoods still require a substantial investment, and they require care to move and expertise to set up, making it difficult to quickly and easily provide additional isolation chambers on demand.

Therefore, it would be desirable to provide an air-filtering laboratory isolation system which could be readily deployed in a laboratory so that a benchtop could be safely isolated from its surroundings, whereby to protect laboratory personnel from hazardous materials (e.g., chemicals, biologics, etc.). Ideally, these air-filtering laboratory isolation systems should be mobile so that they can be rapidly deployed throughout a laboratory or building, particularly when there is a need to quickly and easily provide additional isolation chambers on demand.

In addition to the foregoing, in many situations it can be desirable to provide filtering for room air. By way of example but not limitation, with the current SARS-CoV-2 pandemic, appropriate filtering of room air can help minimize the transmission of the virus from person to person. By way of further example but not limitation, where hazardous materials (e.g., chemicals, biologics, etc.) must be handled in a room, appropriate filtering of room air can minimize hazards to individuals present in the room.

Therefore, it would be desirable to provide a room air-filtering system which could be readily deployed in a room so as to increase the safety of individuals in the room, e.g., such as to reduce their risk from a transmittable virus, or to reduce their risk from hazardous materials (e.g., chemicals, biologics, etc.) which may be present in the room. Ideally, these room air-filtering systems should be mobile so that they can be rapidly deployed throughout a building, particularly when there is a need to quickly and easily provide additional room air-filtering capacity on demand.

In addition to the foregoing, it is also desirable to provide improved air filtration units of increased effectiveness for protecting people against the SARS-CoV-2 virus and other hazardous viruses, microorganisms, etc. Ideally, these improved air filtration units should be configured for use in air-filtering patient isolation systems, air-filtering laboratory isolation systems, room air-filtering systems, and other air-filtering systems.

SUMMARY OF THE INVENTION

The present invention comprises the provision and use of a novel air-filtering patient isolation system which can be readily deployed about an ordinary hospital bed in an ordinary hospital room or ward so that an infected patient can be safely isolated from their surroundings, whereby to protect medical personnel, non-infected patients, etc.

The present invention also comprises the provision and use of a novel air-filtering patient isolation system which can be readily deployed about an ordinary hospital bed in an ordinary hospital room or ward so that a patient being treated with a high-risk medication can be safely isolated from their surroundings, whereby to protect medical personnel, other patients, etc. from exposure to the high-risk medication.

The present invention also comprises the provision and use of a novel air-filtering laboratory isolation system which can be readily deployed in a laboratory so that a benchtop can be safely isolated from its surroundings, whereby to protect laboratory personnel from hazardous materials (e.g., chemicals, biologics, etc.).

The present invention also comprises the provision and use of a novel room air-filtering system which could be readily deployed in a room so as to increase the safety of individuals in the room, e.g., such as to reduce their risk from a transmittable virus, or to reduce their risk from hazardous materials (e.g., chemicals, biologics, etc.) which may be present in the room.

And the present invention also comprises the provision and use of improved air filtration units of increased effectiveness for protecting people against the SARS-CoV-2 virus and other hazardous viruses, microorganisms, etc.

In one preferred form of the invention, there is provided a mobile air-filtering isolation system, the system comprising:
 a base;
 a frame extending upwardly from the base;
 an air filtration unit mounted to the frame; and
 at least one flexible curtain extending downward from the air filtration unit, whereby to form an enclosure.

In another preferred form of the invention, there is provided a mobile air-filtering isolation system for isolating a patient, the system comprising:
 a base;
 a frame extending upwardly from the base;
 an air filtration unit mounted to the frame; and
 at least one flexible curtain extending downward from the air filtration unit, whereby to form an enclosure around the head and torso of a patient.

In another preferred form of the invention, there is provided an air filtration unit for withdrawing air from a room, purifying the withdrawn air, and then returning the purified air back into the room, the air filtration unit comprising a housing comprising:
    an air inlet formed in the housing;
    an air outlet formed in the housing;
    a passageway extending through said housing and connecting the air inlet to the air outlet;
    a filter disposed in the passageway for purifying the air in the passageway;
    a suction fan disposed within said passageway for drawing air from the room into the air inlet through the filter and out of the air outlet to the room; and
    an ultraviolet (UV) light for sterilizing the filter.

In another preferred form of the invention, there is provided a method for isolating a patient, the method comprising:
    providing a mobile air-filtering isolation system for isolating a patient within a room, the system comprising:
        a base;
        a frame extending upwardly from the base;
        an air filtration unit mounted to the frame; and
        at least one flexible curtain extending downward from the air filtration unit, whereby to form an enclosure around the head and torso of a patient;
    positioning the enclosure around the head and torso of the patient; and
    operating the air filtration unit so as to withdraw air from the enclosure, purify the withdrawn air and return the purified air to the room.

In another preferred form of the invention, there is provided a method for purifying a room, the method comprising:
    providing an air filtration unit comprising a housing comprising:
        an air inlet formed in the housing;
        an air outlet formed in the housing;
        a passageway extending through said housing and connecting the air inlet to the air outlet;
        a filter disposed in the passageway for purifying the air in the passageway;
        a suction fan disposed within said passageway for drawing air from the room into the air inlet through the filter and out of the air outlet to the room; and
        an ultraviolet (UV) light for sterilizing the filter; and
    operating the air filtration unit so as to withdraw air from the room, purify the withdrawn air and return the purified air to the room.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DESCRIPTION OF THE INVENTION

Figure 1:
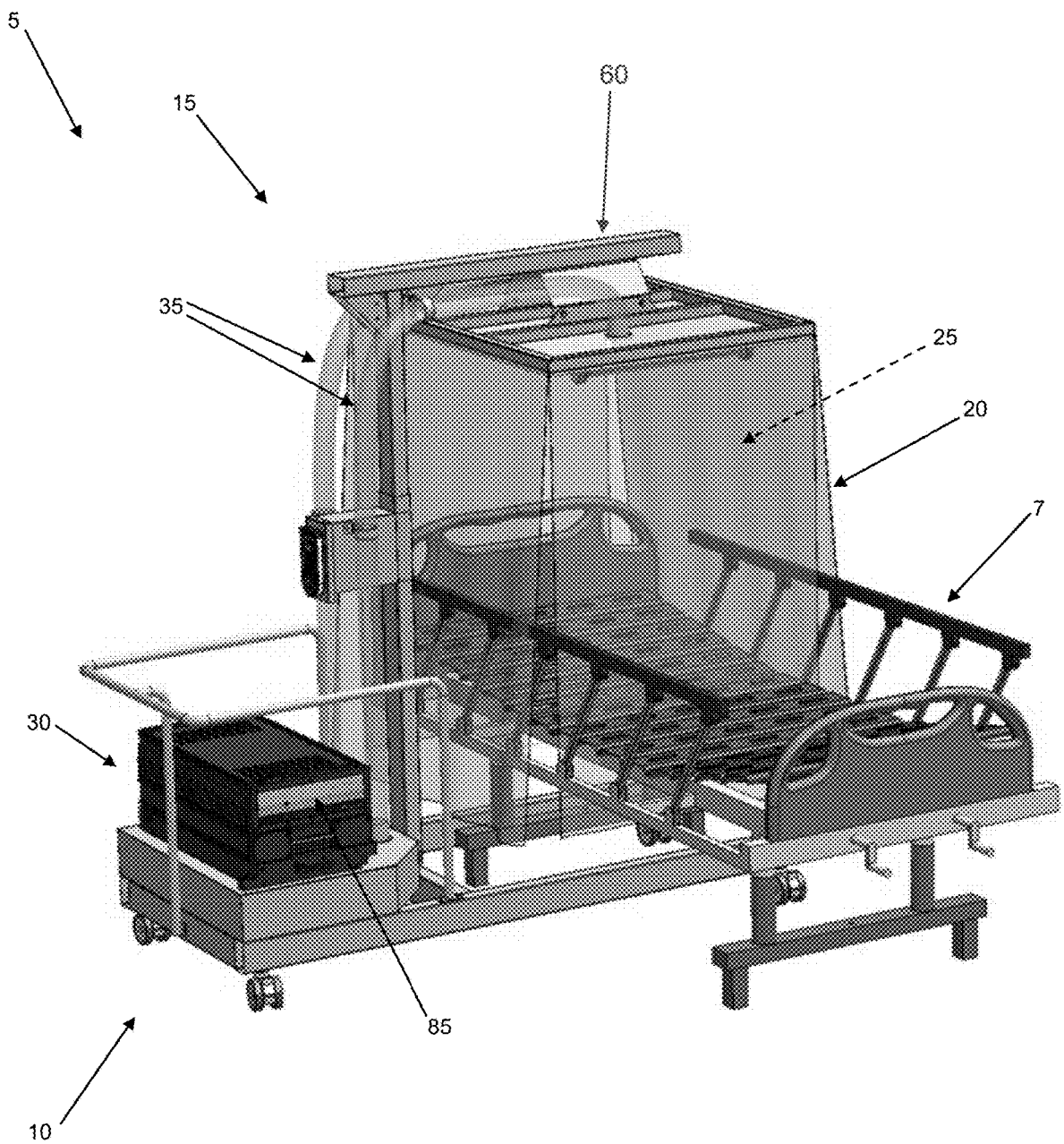
FIGS. 1-6 are schematic views showing a novel "cart-mounted" mobile air-filtering patient isolation system formed in accordance with the present invention.

The present invention provides new and improved air-filtering systems.

More particularly, in one form of the invention, there is provided a new and improved air-filtering patient isolation system which can be readily deployed about an ordinary hospital bed in an ordinary hospital room or ward so that an infected patient can be safely isolated from their surroundings, whereby to protect medical personnel, non-infected patients, etc. This air-filtering patient isolation system is preferably mobile so that it can be rapidly deployed throughout a hospital, particularly when the hospital is treating a rapid influx of infected patients.

In addition to the foregoing, the air-filtering patient isolation system of the present invention can be readily deployed about an ordinary hospital bed in an ordinary hospital room or ward so that a patient being treated with a high-risk medication can be safely isolated from their surroundings, whereby to protect medical personnel, other patients, etc. from exposure to the high-risk medication. Again, this air-filtering patient isolation system is preferably mobile so that it can be rapidly deployed throughout a hospital.

And in one form of the invention, there is provided a new and improved air-filtering laboratory isolation system which can be readily deployed in a laboratory so that a benchtop can be safely isolated from its surroundings, whereby to protect laboratory personnel from hazardous materials (e.g., chemicals, biologics, etc.). This air-filtering laboratory isolation system is preferably mobile so that it can be rapidly deployed throughout a laboratory, particularly when there is a need to quickly and easily provide additional isolation chambers on demand.

And in one form of the invention, there is provided a new and improved room air-filtering system which can be readily deployed in a room so as to increase the safety of individuals in the room, e.g., such as to reduce their risk from a transmittable virus, or to reduce their risk from hazardous materials (e.g., chemicals, biologics, etc.) which may be present in the room. This room air-filtering system is preferably mobile so that it can be rapidly deployed throughout a building, particularly when there is a need to quickly and easily provide additional room air-filtering capacity on demand.

And in one form of the invention, there is provided an improved air filtration unit of increased effectiveness for protecting people against the SARS-CoV-2 virus and other hazardous viruses, microorganisms, etc. This improved air filtration unit is configured for use in air-filtering patient isolation systems, air-filtering laboratory isolation systems, room air-filtering systems, and other air-filtering systems.

1. Mobile Air-Filtering Patient Isolation System 1.1 "Cart-Mounted" Mobile Air-Filtering Patient Isolation System In one form of the invention, and looking now at FIGS. 1-3 and FIGS. 4-6, there is provided a new "cart-mounted" mobile air-filtering patient isolation system 5. "Cart-mounted" mobile air-filtering patient isolation system 5 essentially creates a "personalized negative pressure chamber" for the patient at their bedside, while the patient remains in their bed 7. Note that bed 7 may be a fixed-position patient bed, a wheeled patient bed, a gurney, etc., and bed 7 may be located in an ordinary hospital room or ward, field hospital, patient's home, etc.

"Cart-mounted" mobile air-filtering patient isolation system 5 generally comprises:

a mobile cart 10;

a frame 15 extending upwardly from mobile cart 10;

flexible transparent curtains 20 hanging down from frame 15 so as to form, in conjunction with elements of frame 15 (see below), an enclosure 25 about the head and torso of the patient;

an air filtration unit 30 for withdrawing air from within enclosure 25, purifying the withdrawn air, and then returning the purified air to the room; and one or more tubes 35 for connecting air filtration unit 30 to the interior of enclosure 25.

1.2 Mobile Cart 10

Mobile cart 10 provides mobility for system 5. Mobile cart 10 generally comprises a rectangular base 40 formed by one or more legs 45, and wheels 50 mounted to the base of rectangular base 40 so as to enable mobile cart 10 (and the remainder of system 5) to roll on a floor.

Rectangular base 40 can have a fixed configuration larger than the footprint of air filtration unit 30 (see FIGS. 1-3); or rectangular base 40 can have a fixed configuration substantially the same size as the footprint of air filtration unit 30 (see FIGS. 4-6); or rectangular base 40 can have a fixed configuration of another size; or rectangular base 40 can have a variable configuration where two or more of the legs 45 can telescope so as to increase or decrease their length (and thereby vary the configuration of rectangular base 40).

Wheels 50 allow system 5 to be moved to a position adjacent to a patient's bed. Wheels 50 may be selectively lockable so as to keep system 5 in place adjacent to the patient's bed, e.g., to prevent system 5 from moving in the event that the system is inadvertently bumped by medical personnel or grabbed by a patient, etc. Alternatively, base 40 can be securable to a bed (e.g., by mechanical connectors, not shown) so as to keep system 5 in place adjacent to the patient's bed, e.g., to prevent system 5 from moving in the event that the system is inadvertently bumped by medical personnel or grabbed by a patient, etc.

Note that mobile cart 10 (and the remainder of system 5) is preferably configured so that it can approach the patient's bed from the side of the bed (see FIGS. 1-3), or from the head of the bed (see FIGS. 4-6), etc. Note also that in both configurations of system 5 (i.e., the configuration of FIGS. 1-3 and the configuration of FIGS. 4-6), while portions of mobile cart 10 are designed to fit under bed 7, other portions of mobile cart 10 and air filtration unit 30 may not be positionable under bed 7.

1.3 Frame 15

Frame 15 extends upwardly from mobile cart 10 and supports flexible transparent curtains 20 so as to form, in conjunction with elements of frame 15 (see below), enclosure 25 about the head and torso of the patient. Frame 15 comprises a vertical riser 55 which is mounted to rectangular base 40 of mobile cart 10, and a top support 60 which is set at the top of vertical riser 55. Flexible transparent curtains 20 hang down from top support 60.

Figure 2:
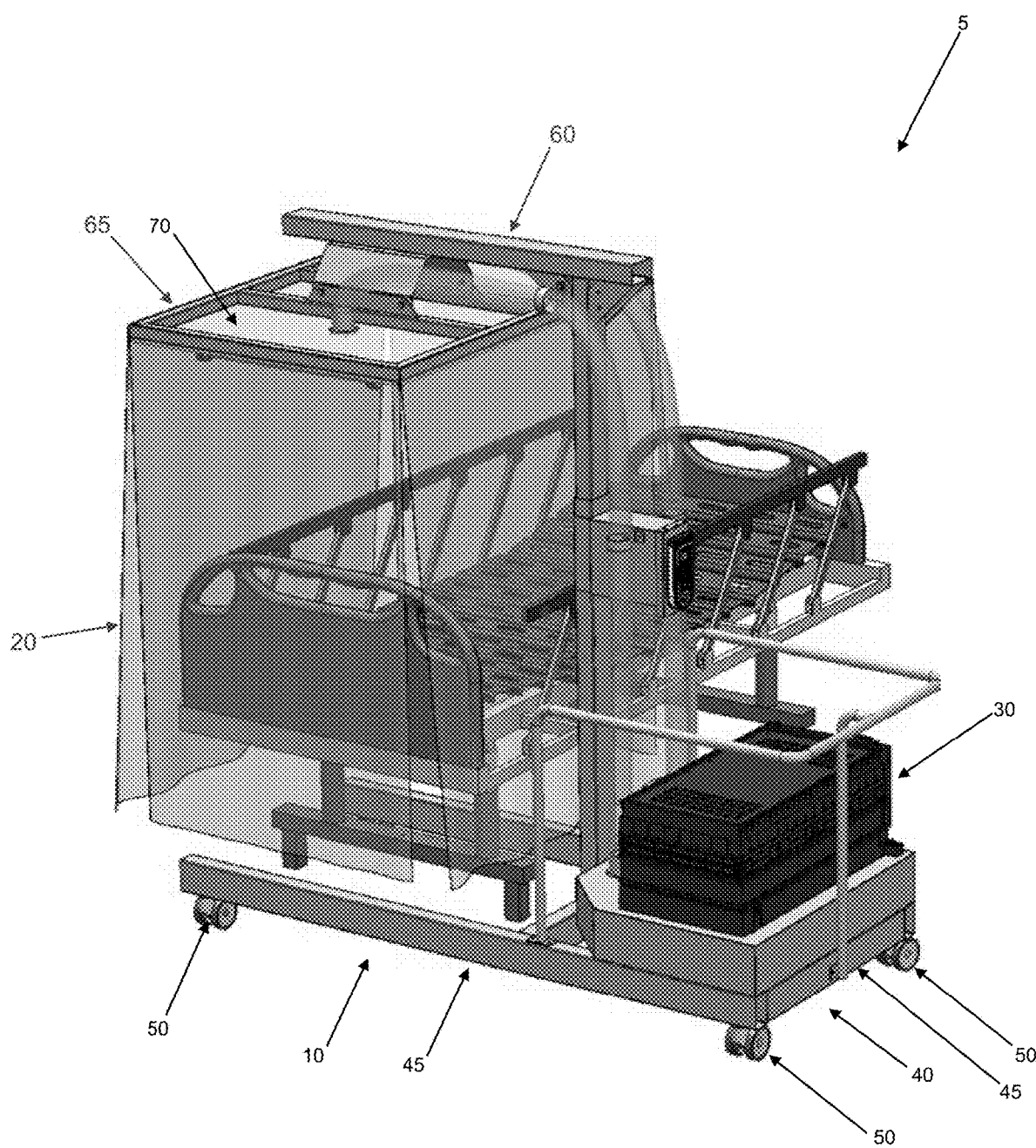
Figure 3:
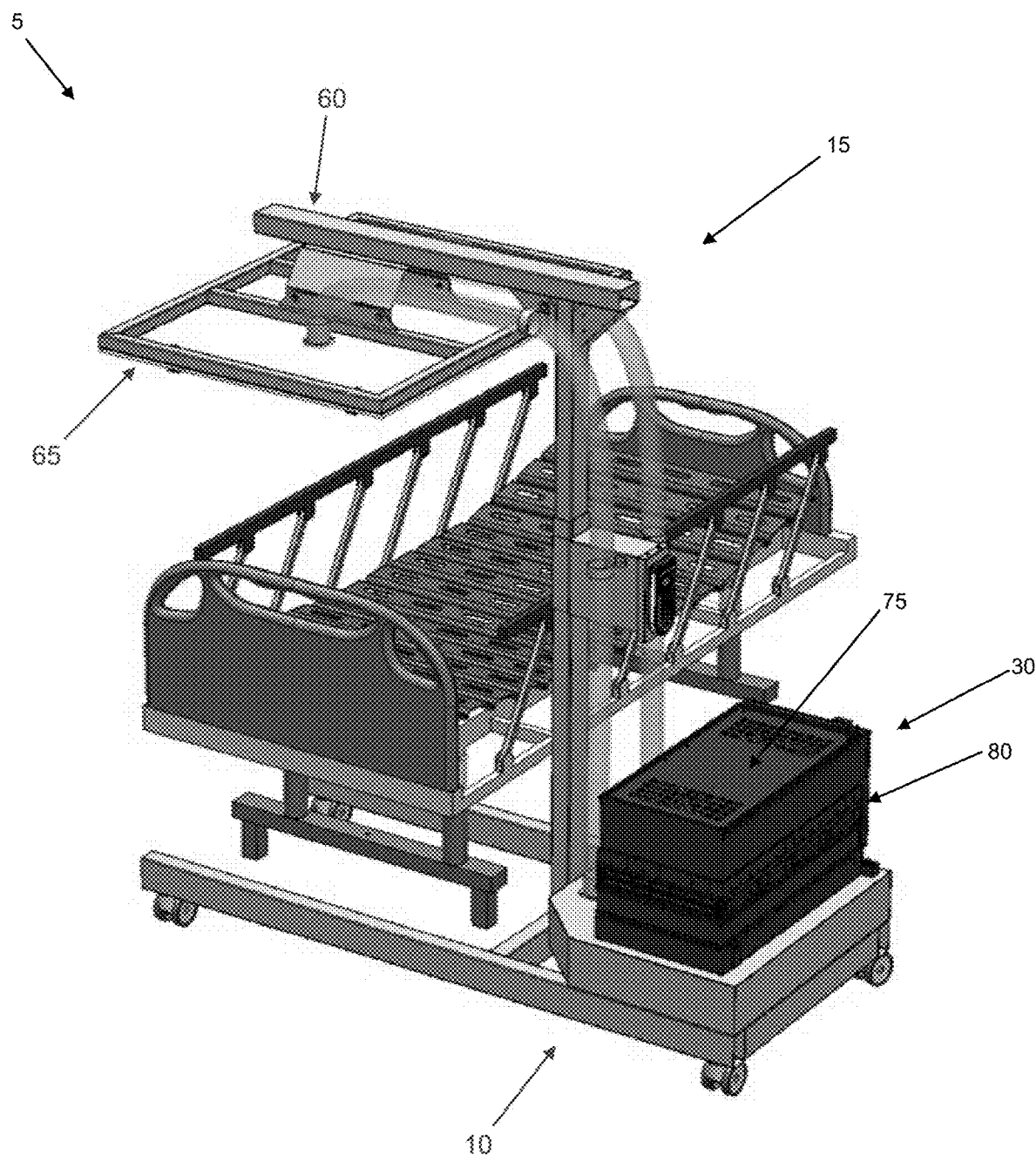
Figure 4:
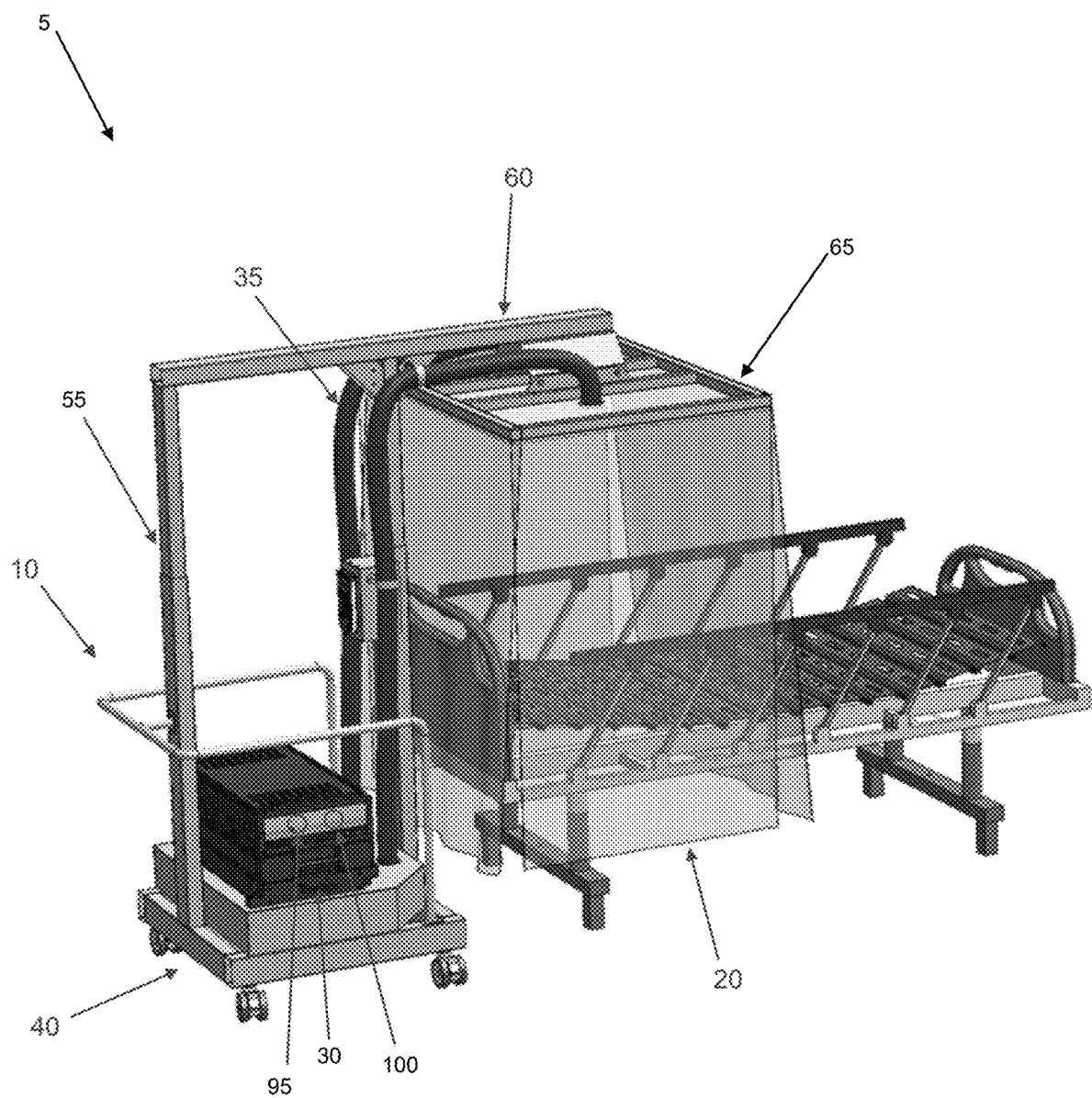
Figure 5:
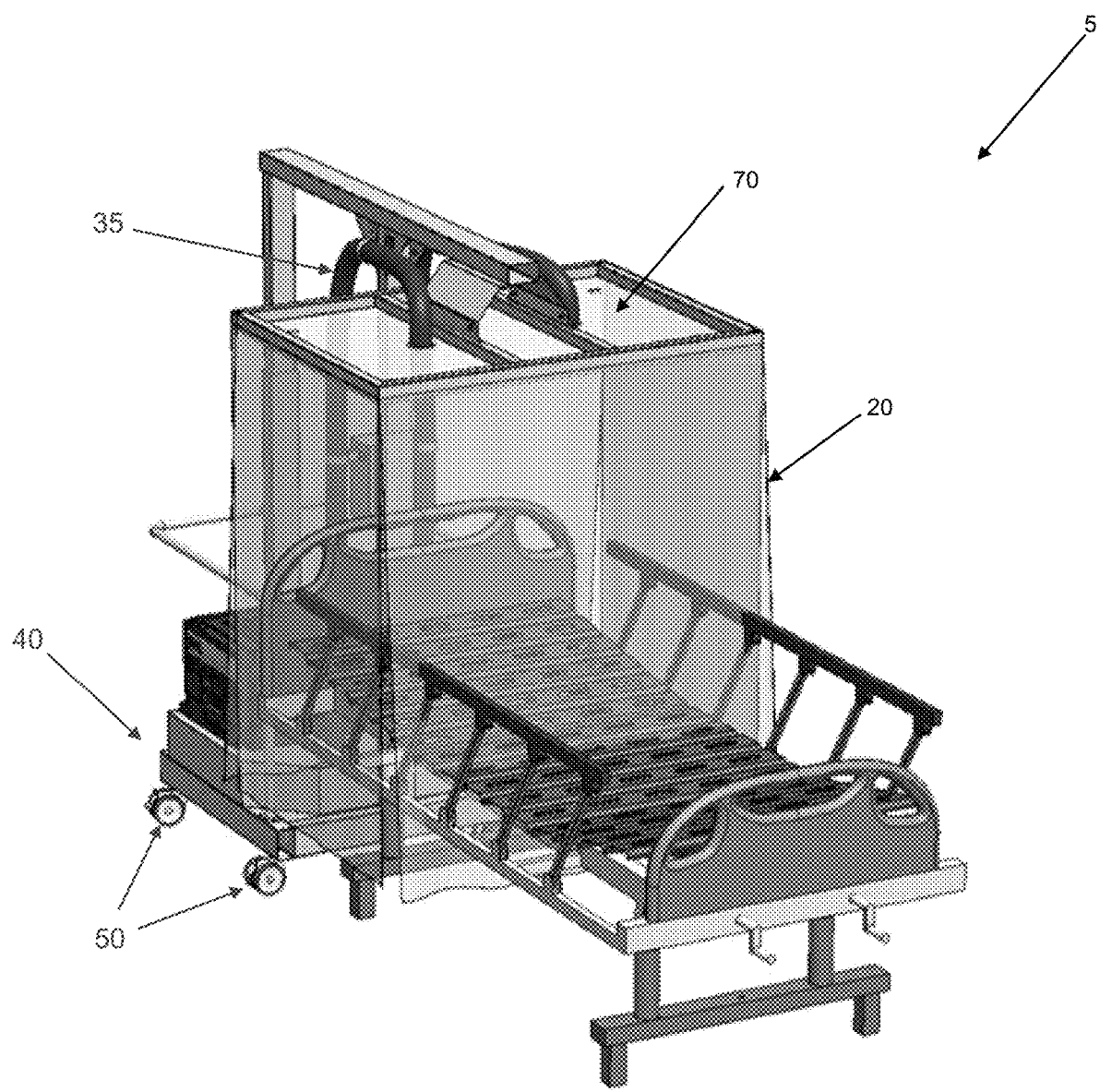
Figure 6:
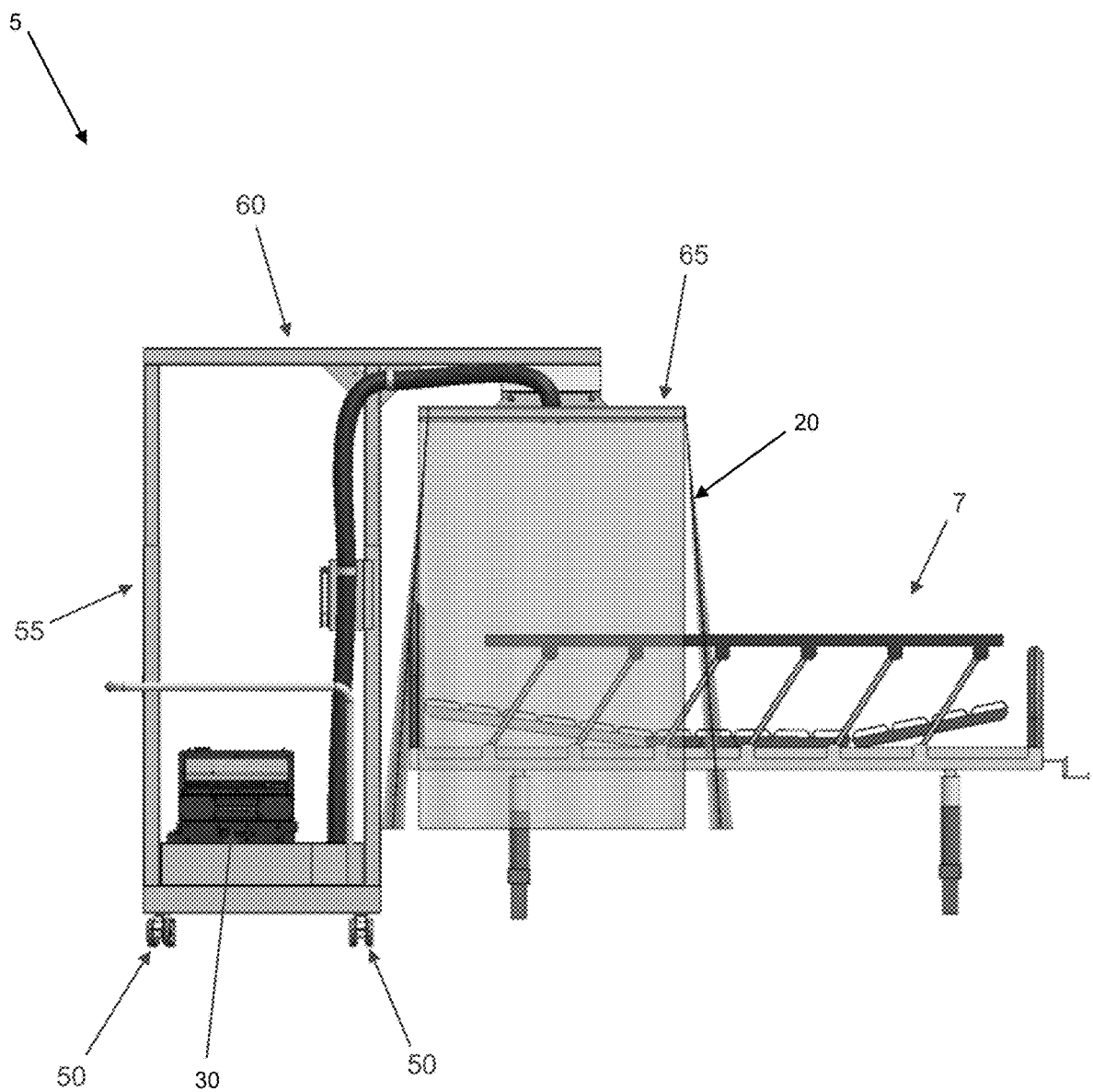

Vertical riser 55 preferably telescopes upwardly and downwardly so as to enable the height of top support 60 to be adjusted. Vertical riser 55 preferably can rotate about its axis, so as to allow top support 60 to be aligned with the footprint of mobile cart 10 (e.g., in order to reduce the footprint of system 5 during transport, such as is shown in FIGS. 1-3) or to project to one side of mobile cart 10 (e.g., during disposition of system 5 about the bed of the patient, such as is shown in FIGS. 4-6). Note that vertical riser 55 can be located intermediate one side of rectangular base 40 of mobile cart 10 (see, for example, FIGS. 1-3 and FIGS. 4-6), or vertical riser 55 can be located on one corner of rectangular base 40 of mobile cart 10 (not shown in FIGS. 1-3 or FIGS. 4-6), etc.

Top support 60 provides a support for hanging flexible transparent curtains 20 about the head and torso of the patient, and provides elements (see below) which work in conjunction with flexible transparent curtains 20 so as to collectively form enclosure 25 about the head and torso of the patient. More particularly, in one form of the invention, top support 60 comprises a top frame 65 which carries a transparent top 70. Top frame 65, transparent top 70 and flexible transparent curtains 20 together form enclosure 25. The one or more tubes 35 communicate with the interior of enclosure 25 through openings formed in transparent top 70). Top frame 65 can have a fixed configuration (in which case transparent top 70 can be a substantially rigid transparent panel or a flexible transparent sheet), or top frame 65 can have an adjustable configuration, e.g., a telescoping metal frame (in which case transparent top 70 preferably comprises a flexible transparent canopy which can adjustably span the interior of top frame 65 so as to close it off). Note that if top frame 65 has an adjustable configuration, flexible transparent curtains 20 (which hang down from top frame 65), and the transparent top 70, may have a "shower curtain" configuration so that flexible transparent curtains 20 and transparent top 70 can adjust to the variable configuration of top frame 65 and still provide a substantially complete enclosure 25.

1.4 Flexible Transparent Curtains 20

Flexible transparent curtains 20 attach to top frame 65 of frame 15 and, together with transparent top 70, form the complete enclosure 25.

Flexible transparent curtains 20 can be made of soft polyvinyl chloride (PVC) (e.g., "Eisenglas"). Flexible transparent curtains 20 can consist of one sheet for each side (or edge) of top frame 65 (such as is shown in FIGS. 1-3), or flexible transparent curtains 20 can consist of multiple sheets for each side (or edge) of top frame 65 (e.g., to make it easier for medical personnel to pass a hand through the curtains).

1.5 Air Filtration Unit 30

Figure 6A:
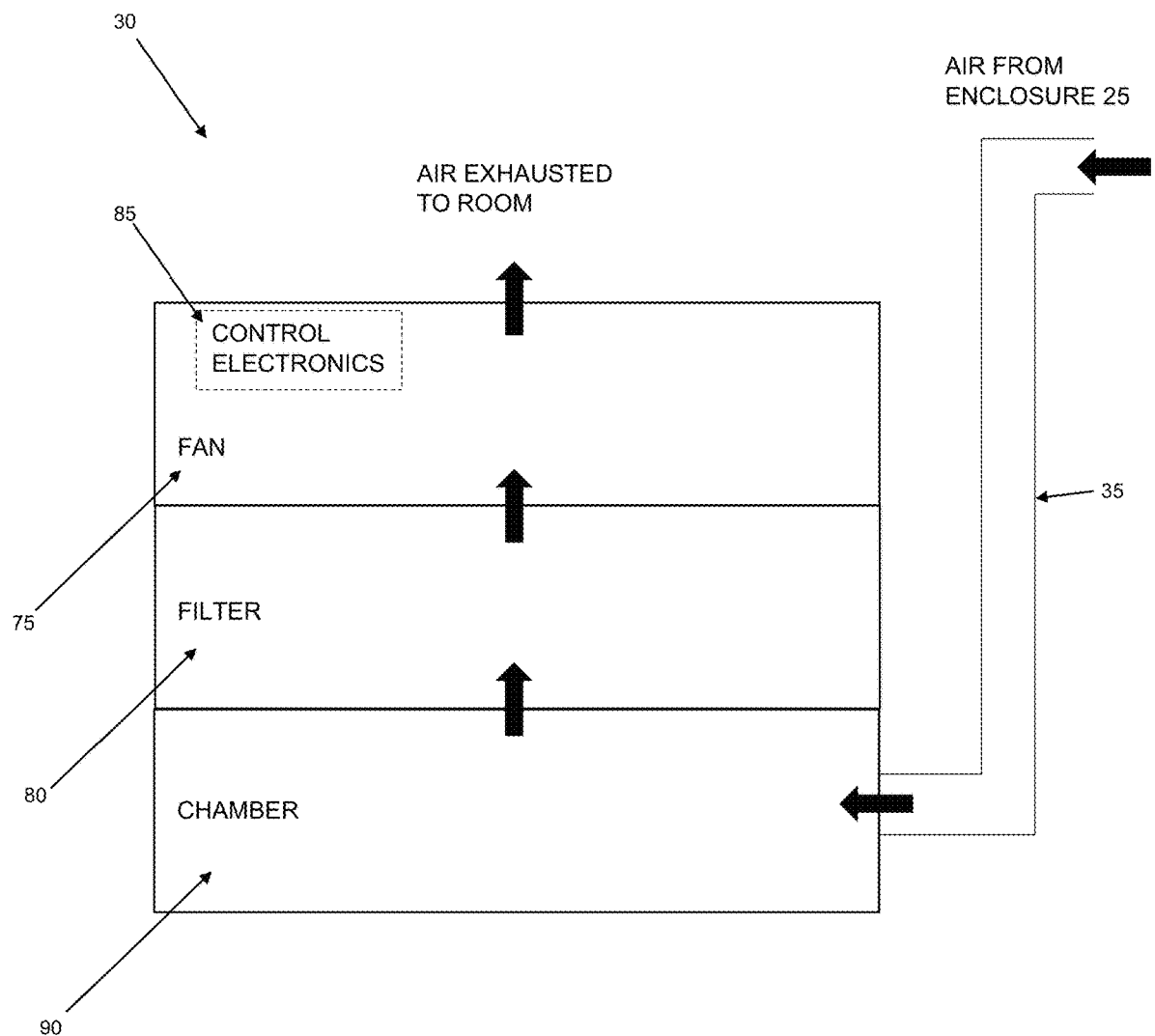
FIG. 6A is a schematic view showing aspects of a novel air filtration unit formed in accordance with the present invention.

Air filtration unit 30 is provided for withdrawing air from within enclosure 25, purifying the withdrawn air, and then returning the purified air back into the room. To this end, and looking now at FIG. 6A, air filtration unit 30 is connected to enclosure 25 via one or more tubes 35, and air filtration unit 30 comprises a suction fan 75, a filter 80, and control electronics 85 for driving suction fan 75. Suction fan 75 pulls air out of enclosure 25 via the one or more tubes 35, creating negative pressure within enclosure 25 in the process, thereby ensuring that air within enclosure 25 does not pass through flexible transparent curtains 20 and into the room. At the same time, flexible transparent curtains 20 enable room air to pass through the gaps between the curtains so as to replenish the air withdrawn from enclosure 25 via air filtration unit 30 and the one or more tubes 35. Suction fan 75 pulls the air from enclosure 25 into a chamber (or plenum) 90 and then through filter 80, where the air from enclosure 25 is purified. Thus it will be seen that the only air leaving enclosure 25 passes through filter 80 before it is returned back into the room.

Filter 80 of air filtration unit 30 is configured according to the particular application it is to be used for, e.g., for the patient isolation system, the filter may be a so-called High-Efficiency Particulate Air ("HEPA") filter, or a so-called Ultra Low Particulate Air ("ULPA") filter, for trapping harmful vapor droplets and/or particulates, so that the air returned to the room by air filtration unit 30 has been purified of dangerous contaminants, e.g. harmful viruses, microorganisms, etc. Or filter 80 may comprise a molecular filter for dealing with certain medications, etc. By way of example but not limitation, filter 80 may comprise a HEPA filter of the sort available from Erlab D.F.S. S.A.S. ("Erlab") (e.g., the Erlab HEPA H14 High-Efficiency Particulate filter), or filter 80 may comprise a molecular filter of the sort available from Erlab (e.g., the Erlab BE+, BE, AS, F, K and/or G filter).

Air filtration unit 30 can be battery powered, e.g., so that there are no power cords to trip over. A battery-powered air filtration unit 30 also enables the system to be used where there is no readily-available wall plug power.

And air filtration unit 30 can be wirelessly connected to a "remote" monitoring and/or control system, e.g., to a hospital monitoring and control system, or to a smartphone or tablet, etc.

Air filtration unit 30 can also be provided with lights 95, and/or sound units 100, etc. to convey system status to medical personnel, e.g., a steady green light to indicate proper system function, a blinking red light to indicate a system warning or alert, a beeping noise to indicate a system warning or alert, etc.

1.6 One or More Tubes 35

One or more tubes 35 are provided for connecting air filtration unit 30 to the interior of enclosure 25, so that air filtration unit 30 can withdraw air from the interior of enclosure 25 and filter that air before returning the filtered air to the room.

Tubes 35 can be formed out of flexible hoses or rigid tubes. However, it is important that tubes 35 be constructed so that they can accommodate movement of frame 15 (upwardly or downwardly, and/or rotationally) about the bedside of the patient. Therefore, if a tube 35 is formed out of rigid tubes, the rigid tubes are preferably configured so that they can telescope upwardly or downwardly with the movement of frame 15. Furthermore, if a tube 35 is formed out of rigid tubes, the rigid tubes are preferably configured so that they can rotate with rotation of frame 15.

1.7 Exemplary Use

"Cart-mounted" mobile air-filtering patient isolation system 5 may be used as follows. System 5 is rolled on its wheels 50 so that the system is positioned adjacent to the patient's bed, and then frame 15 is adjusted so that flexible transparent curtains 20 form, in conjunction with transparent top 70, the enclosure 25 about the head and torso of the patient. Then air filtration unit 30 is activated so as to withdraw air from within enclosure 25 and purify that air via filter 80 before returning the purified air to the room. Note that during operation of system 5, system 5 essentially creates a "personalized negative pressure chamber" about the head and torso of the patient at their bedside, while the patient remains on their bed. As a result, medical personnel, other patients, etc. can be isolated against the patient within enclosure 25, as well as protected against certain medications which might be present in enclosure 25.

1.8 "Wheeled" Mobile Air-Filtering Patient Isolation System

Figure 7:
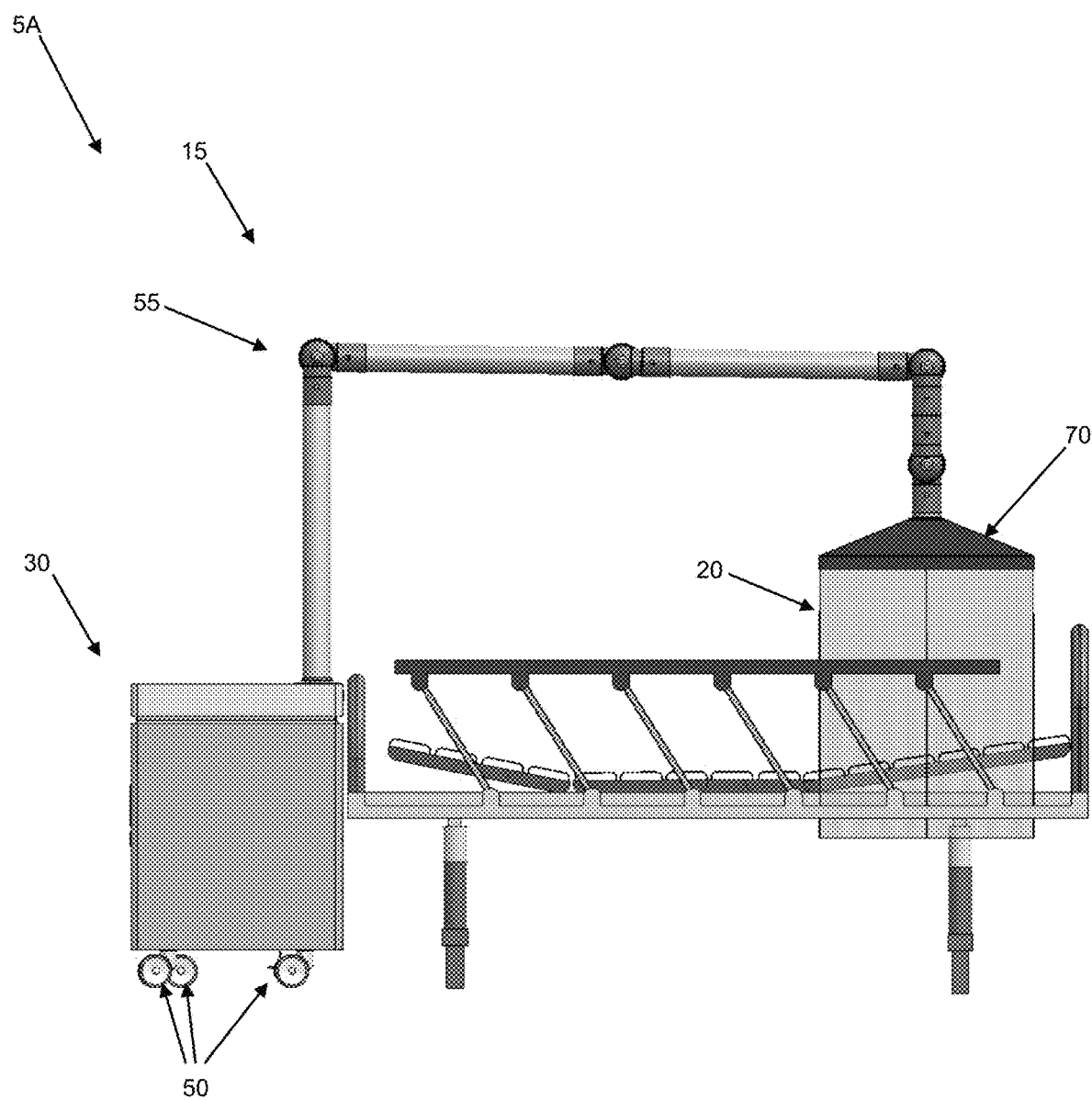
FIGS. 7-9 are schematic views showing a novel "wheeled" mobile air-filtering isolation system formed in accordance with the present invention.
Figure 8:
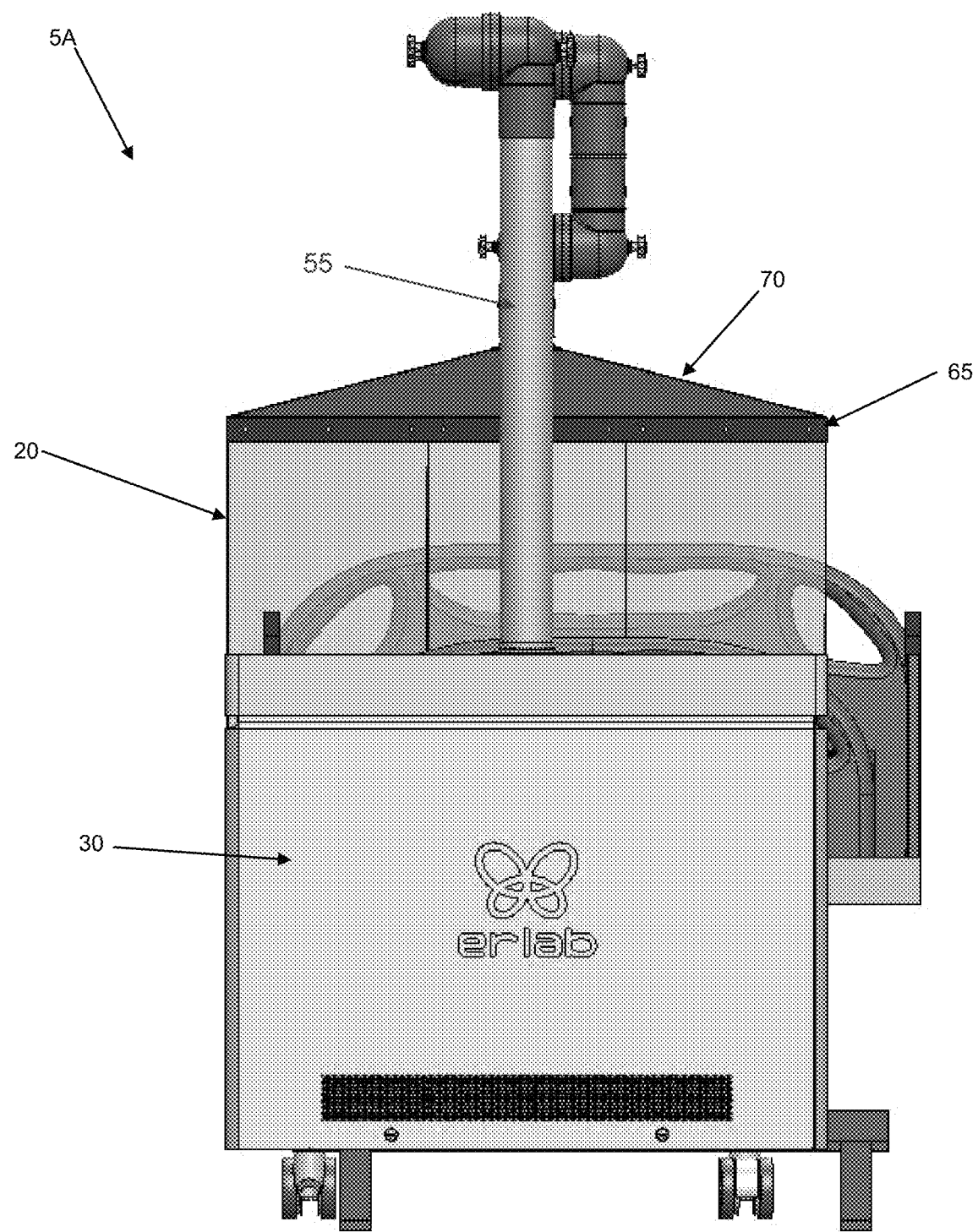
Figure 9:
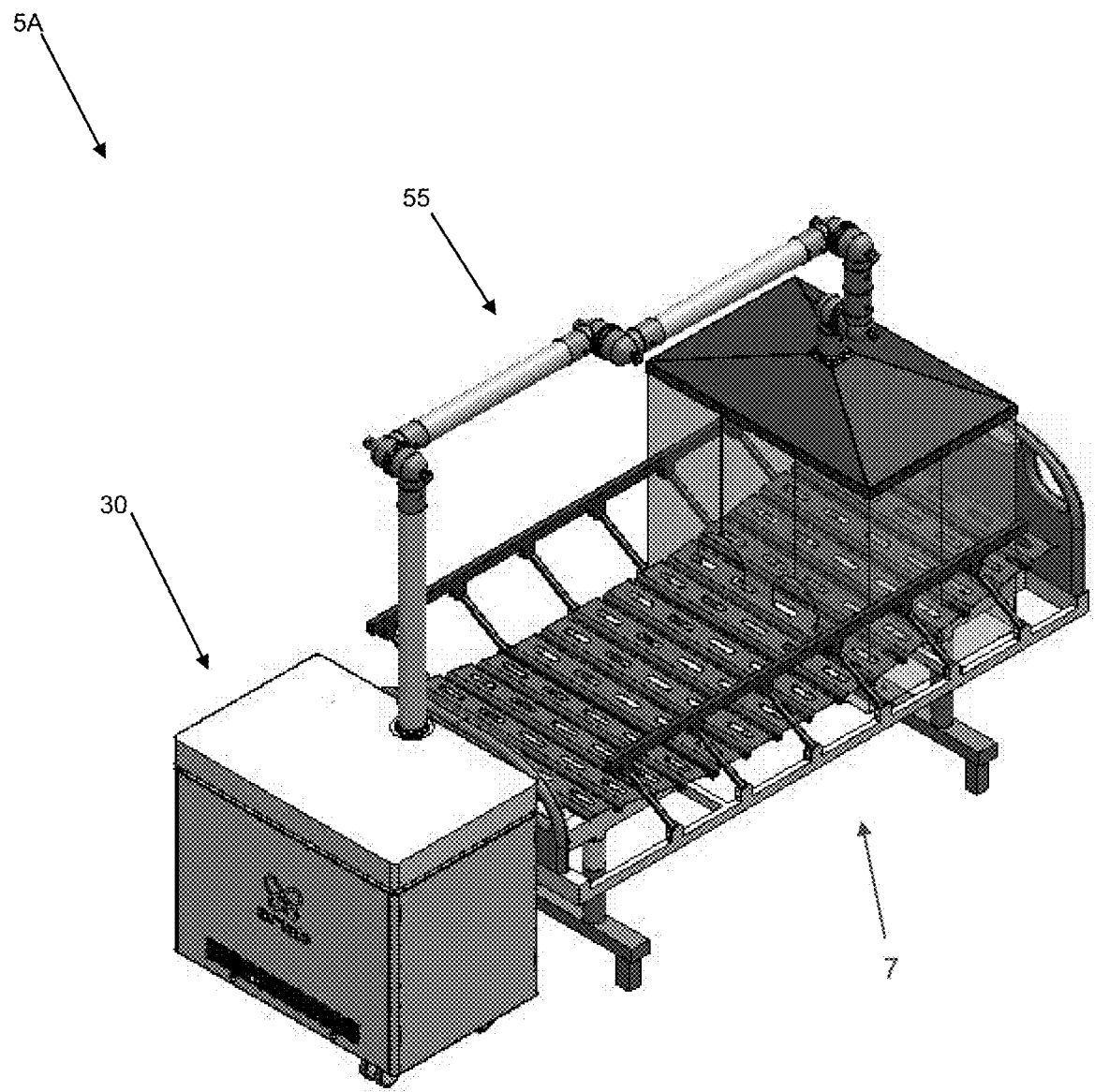
Figure 9A:
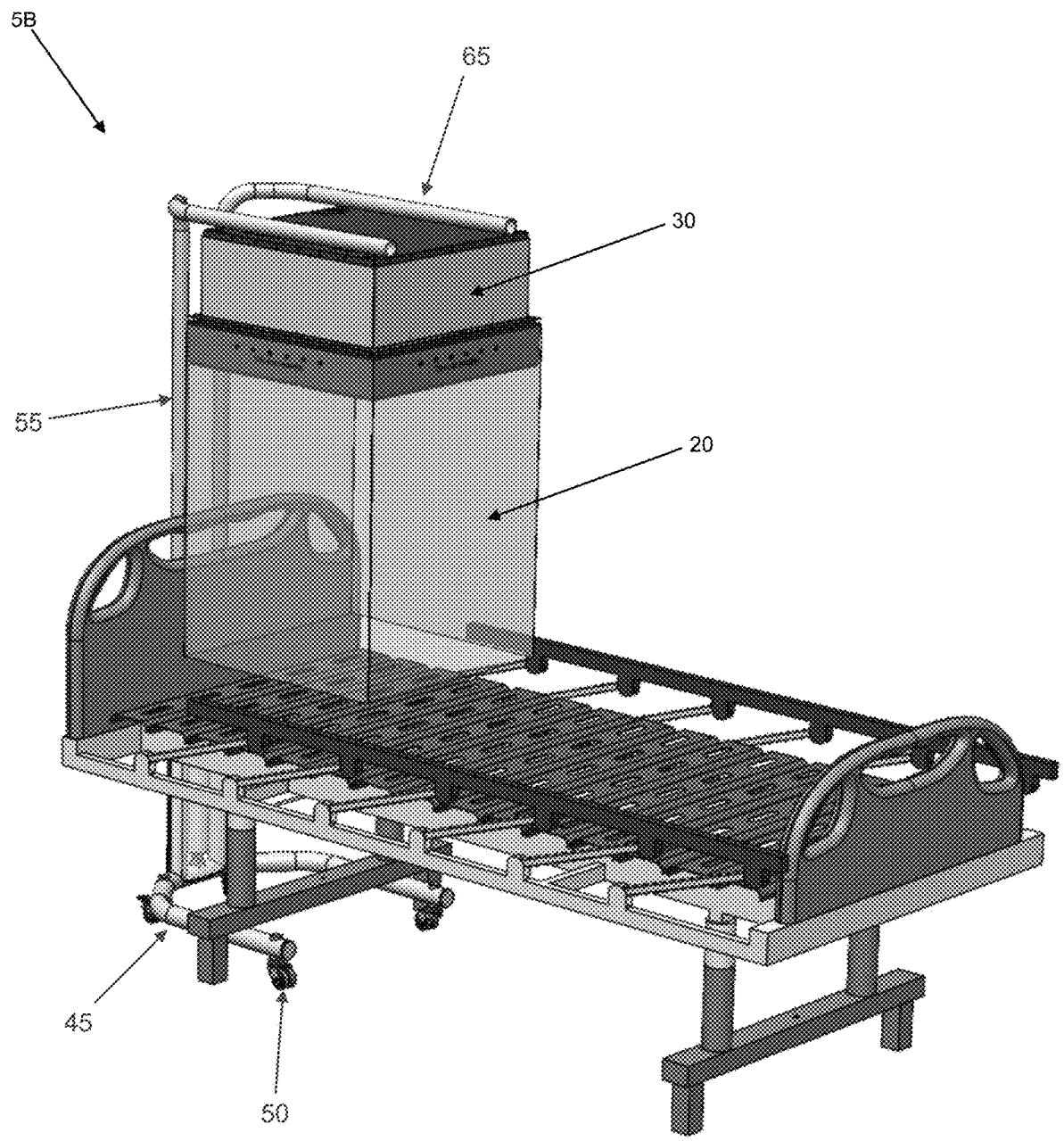
FIGS. 9A-9D are schematic views showing a novel "rolling" mobile air-filtering patient isolation system formed in accordance with the present invention.
Figure 9B:
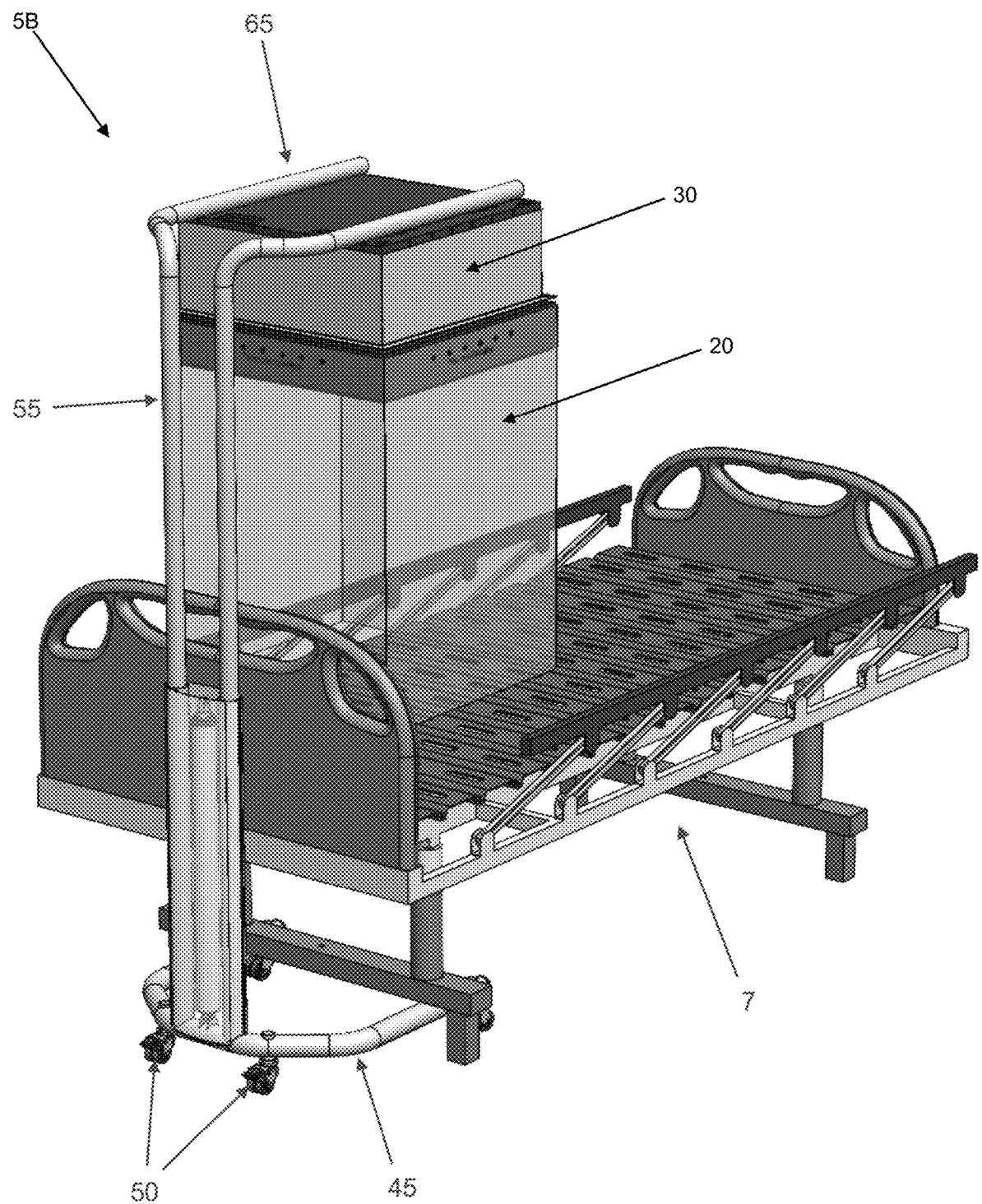
Figure 9C:
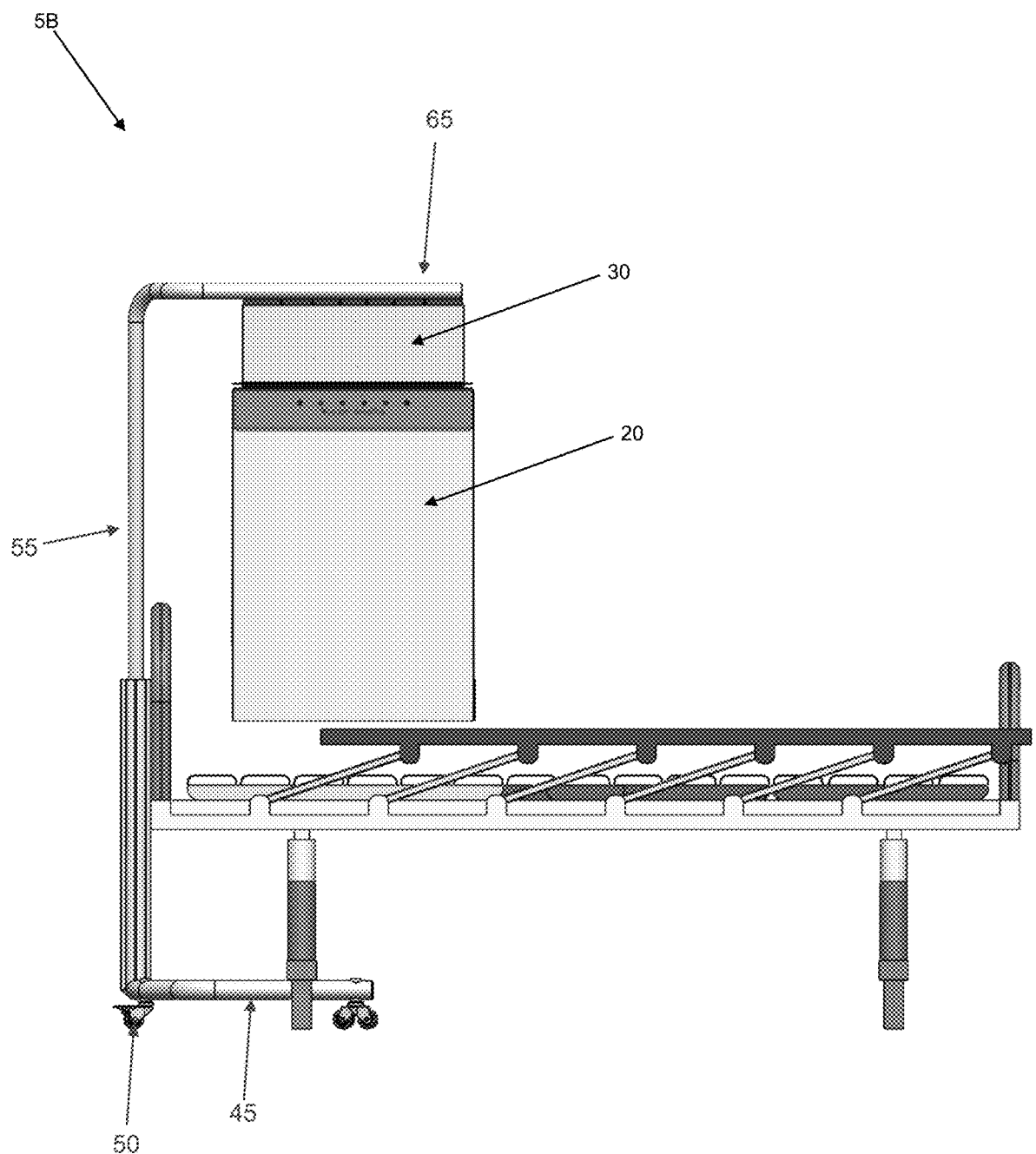
Figure 9D:
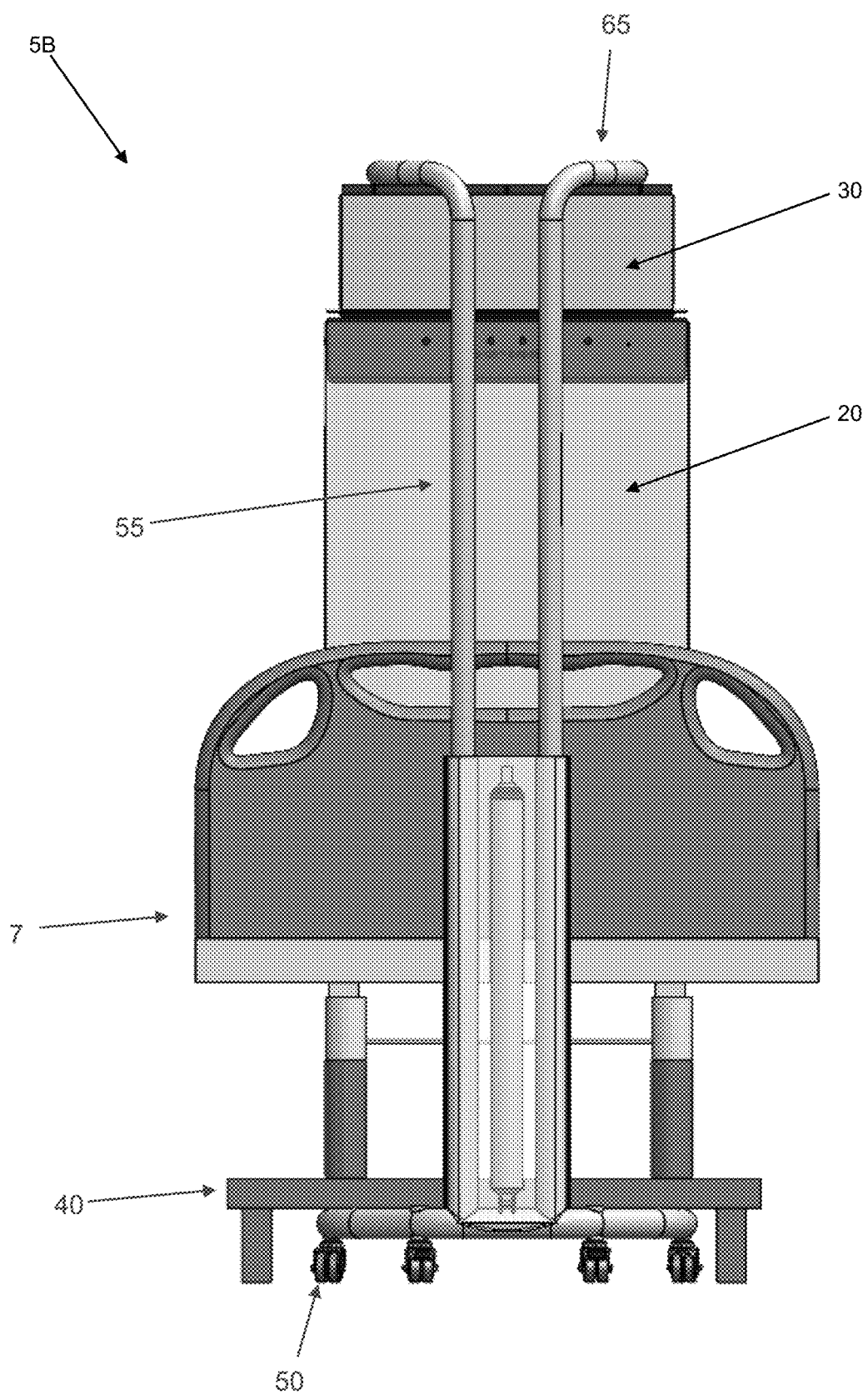

In another form of the invention, and looking now at FIGS. 7-9, there is provided a new "wheeled" mobile air-filtering patient isolation system 5A. "Wheeled" mobile air-filtering patient isolation system 5A is generally similar to the aforementioned "cart-mounted" mobile air filtering system 5 in form and function, except that:

(i) mobile cart 10 is eliminated, and wheels 50 are mounted directly to the bottom of air filtration unit 30;
(ii) frame 15 is mounted directly to air filtration unit 30; and
(iii) vertical riser 55 and the one or more tubes 35 are combined into a singular structure, e.g., vertical riser 55 comprises a hollow structure, with the one or more tubes 35 extending within the interior of the hollow vertical riser (or being provided as the interior of the hollow vertical riser).

Note that, if desired, and as shown in FIGS. 7-9, hollow vertical riser 55 may comprises a plurality of rigid tubes connected together with articulating joints.

1.9 "Rolling" Mobile Air-Filtering Patient Isolation System

In another form of the invention, and looking now at FIGS. 9A-9D, there is provided a new "rolling" mobile air-filtering patient isolation system 5B. "Rolling" mobile air-filtering patient isolation system 5B is generally similar to the aforementioned "cart-mounted" mobile air filtering system 5 in form and function, except that:

(i) the one or more tubes 35 and transparent top 70 are eliminated; and
(ii) air filtration unit 30 is mounted to, and closes off, top support 65, so that air filtration unit 30 is in direct contact with the air within enclosure 25.

1.10 "Rolling" and "Foldable" Mobile Air-Filtering Patient Isolation System

In another form of the invention, and looking now at FIGS. 9E-9I, there is provided a new "rolling" and "foldable" mobile air-filtering patient isolation system 5BF. "Rolling" and "foldable" mobile air-filtering patient isolation system 5BF is generally similar to the aforementioned "cart-mounted" mobile air filtering system 5 in form and function, except that:

(i) the one or more tubes 35 and transparent top 70 are eliminated;
(ii) air filtration unit 30 is mounted to, and closes off, top support 65, so that air filtration unit 30 is in direct contact with the air within enclosure 25; and
(iii) at least a portion of frame 15 may be transformed between an upright position (FIGS. 9E, 9F, 9H and 9I) and a collapsed position (FIG. 9G).

More particularly, and looking now at FIGS. 9E-9I, "rolling" and "foldable" mobile air filtering patient isolation system 5BF generally comprises a mobile cart 10, a frame 15 extending upwardly from mobile cart 10, an air filtration unit 30 mounted to frame 15, and flexible transparent curtains 20 hanging down from air filtration unit 30 so as to form an enclosure 25 about the head and torso of a patient.

Mobile cart 10 generally comprises a base 40 formed by one or more legs 45, and wheels 50 mounted to base 40 so as to enable mobile cart 10 (and the remainder of system 5BF) to roll on a floor.

Frame 15 preferably comprises at least one vertical riser 55 (which is mounted at its bottom end to base 40 of mobile cart 10) and a top frame 65. Air filtration unit 30 is mounted to, and closes off, top support 65, so that air filtration unit 30 is in direct contact with the air within enclosure 25. Flexible curtains 20 hang down from air filtration unit 30.

Vertical riser 55 preferably telescopes upwardly and downwardly so as to enable the height of top frame 65 (and air filtration unit 30) to be adjusted. It will be appreciated that since vertical riser 55 is vertically adjustable, system 5BF can accommodate a wide range of existing objects, without the need to modify those objects in any manner.

A hinge 56 connects vertical riser 55 to top frame 65 such that top frame 65 (and hence, air filtration unit 30 mounted thereto) may be selectively pivoted from an upright position to a collapsed position. A second hinge 57 connects vertical riser 55 to base 40 such that base 40 may be selectively pivoted from the upright position to the collapsed position. See FIGS. 9E, 9F, 9H and 9I which show top frame 65 and base 40 in their upright position (for providing an enclosure for a patient), and FIG. 9G which show top frame 65 and base 40 in their collapsed position for storage. Top frame 65 and/or base 40 may be configured to be manually or electrically opened or collapsed in ways that will be apparent to one of ordinary skill in the art in view of the present disclosure.

Flexible transparent curtains 20 are preferably attached to the lower perimeter of air filtration unit 30 by a type of fastener that will permit flexible transparent curtains 20 to be attached to air filtration unit 30 in a removable manner so that flexible transparent curtains 20 can be mounted to air filtration unit 30 when system 5BF is in its upright position, and removed from air filtration unit 30 when system 5BF is in its collapsed position. By way of example but not limitation, flexible transparent curtains 20 may be attached to air filtration unit 30 using hooks, zippers, hook and loop fasteners, screws, magnets, or any other type of fastener which would permit curtains 20 to be attached to air filtration unit 30 in a removable manner.

If desired, "rolling" mobile air filtering patient isolation system 5BF may comprise a storage container (not shown) for storing one or more curtains 20 when system 5BF is not in use. By way of example but not limitation, such a storage container may be in the form of a box mounted to frame 15 (e.g., to vertical riser 55), a tube mounted to frame 15, a pouch mounted to frame 15, etc.

Figure 9E:
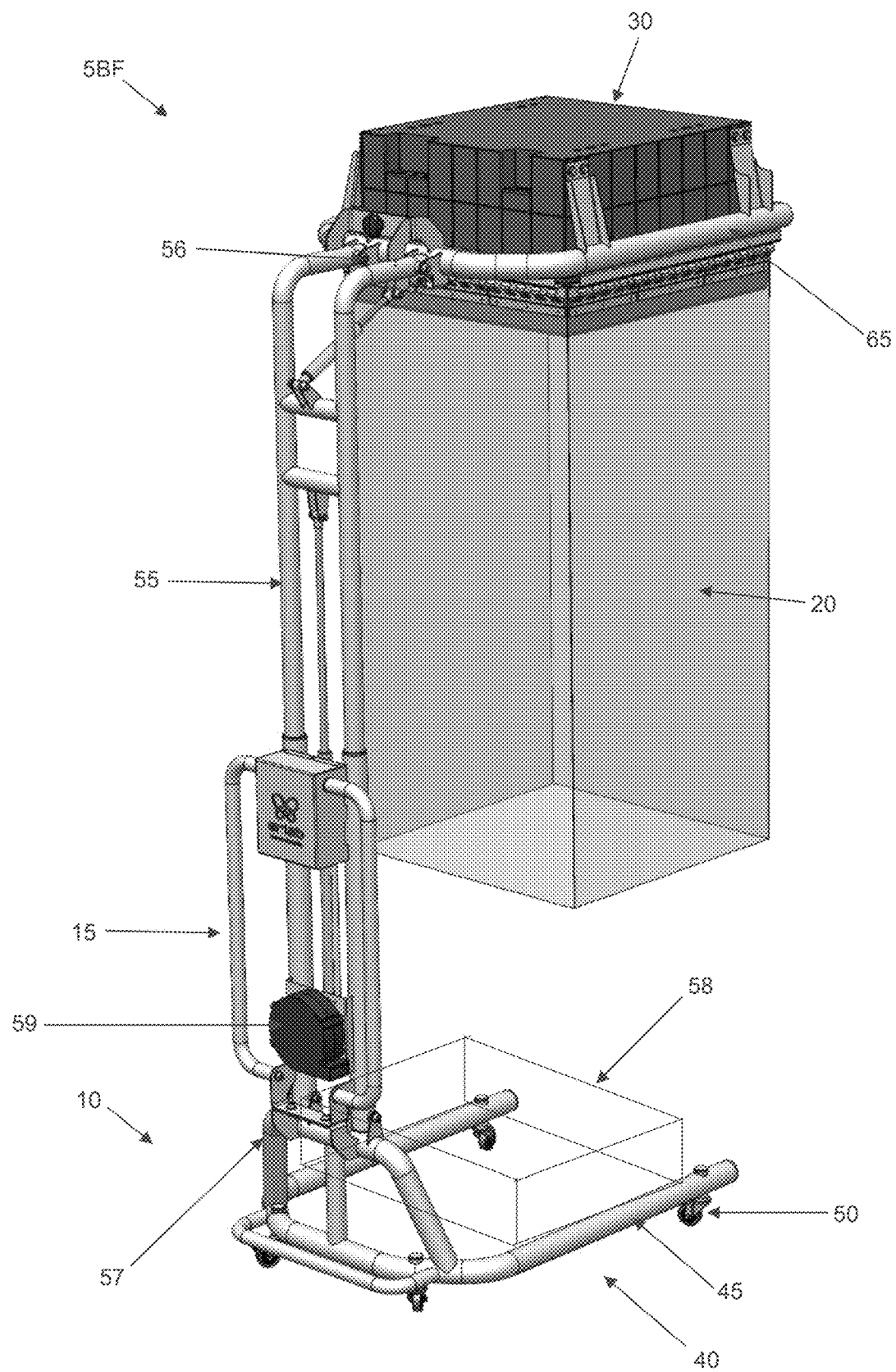
FIGS. 9E-9I are schematic views showing a novel "rolling" and "foldable" mobile air-filtering patient isolation system formed in accordance with the present invention.
Figure 9F:
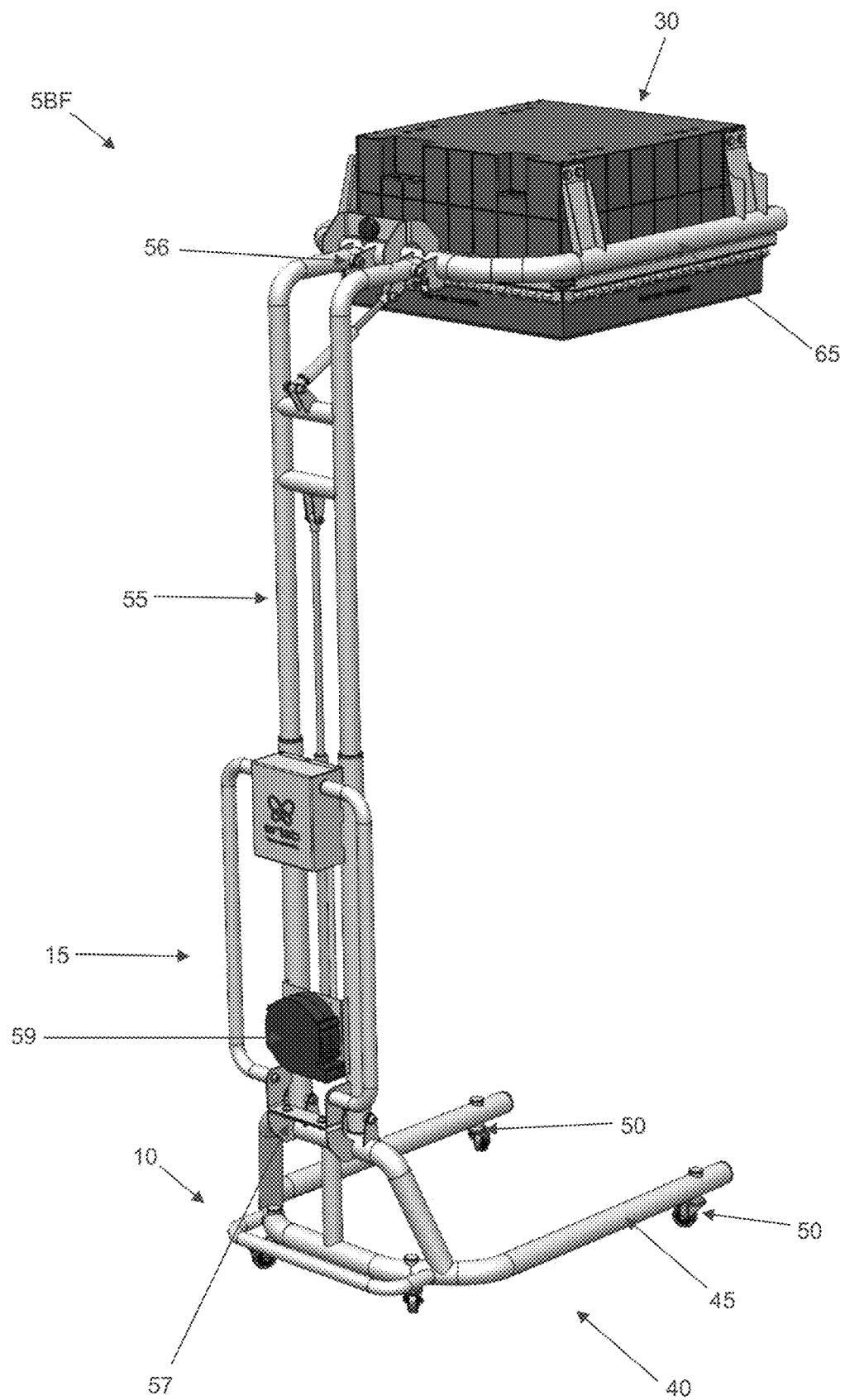
Figure 9G:
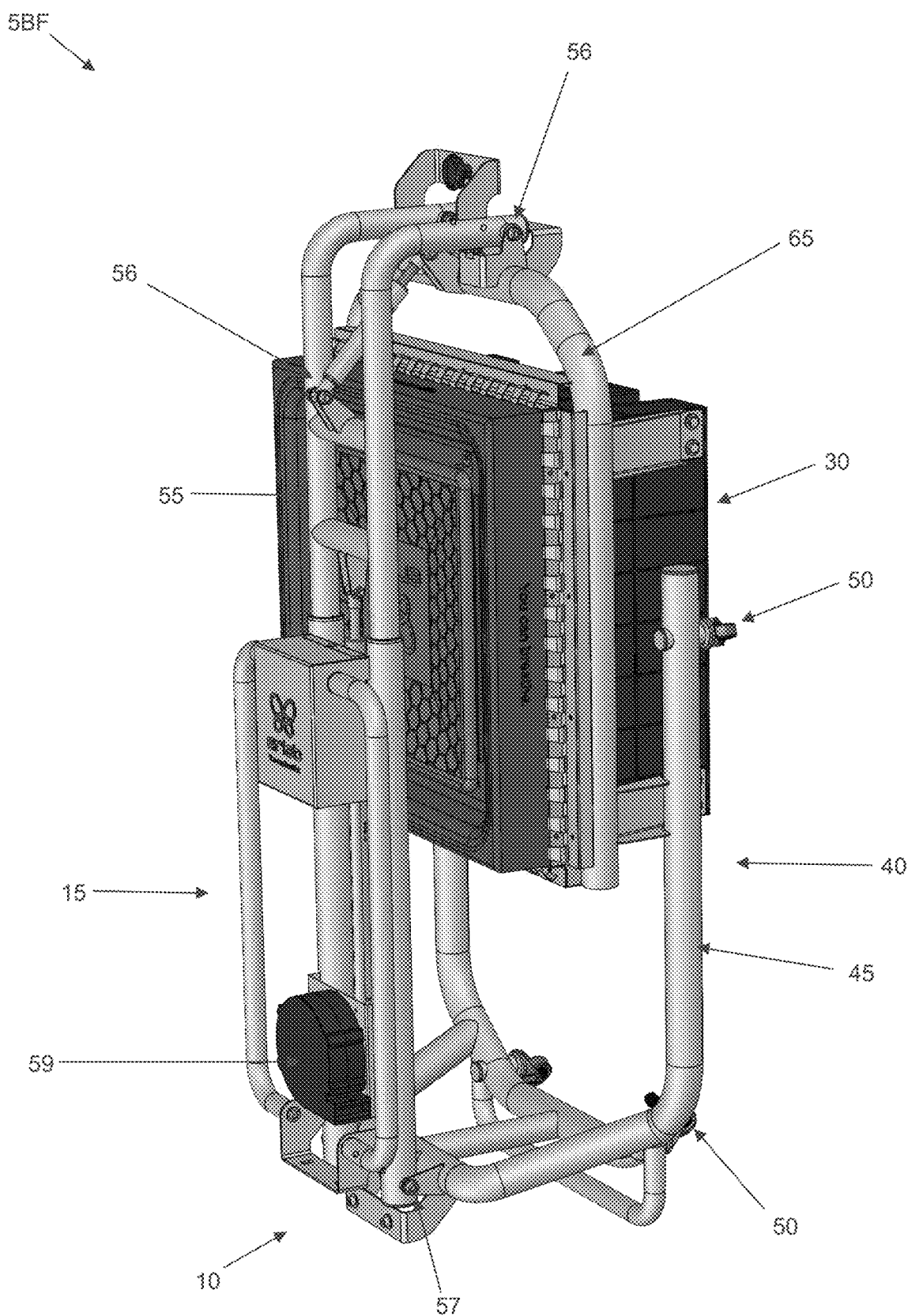
Figure 9H:
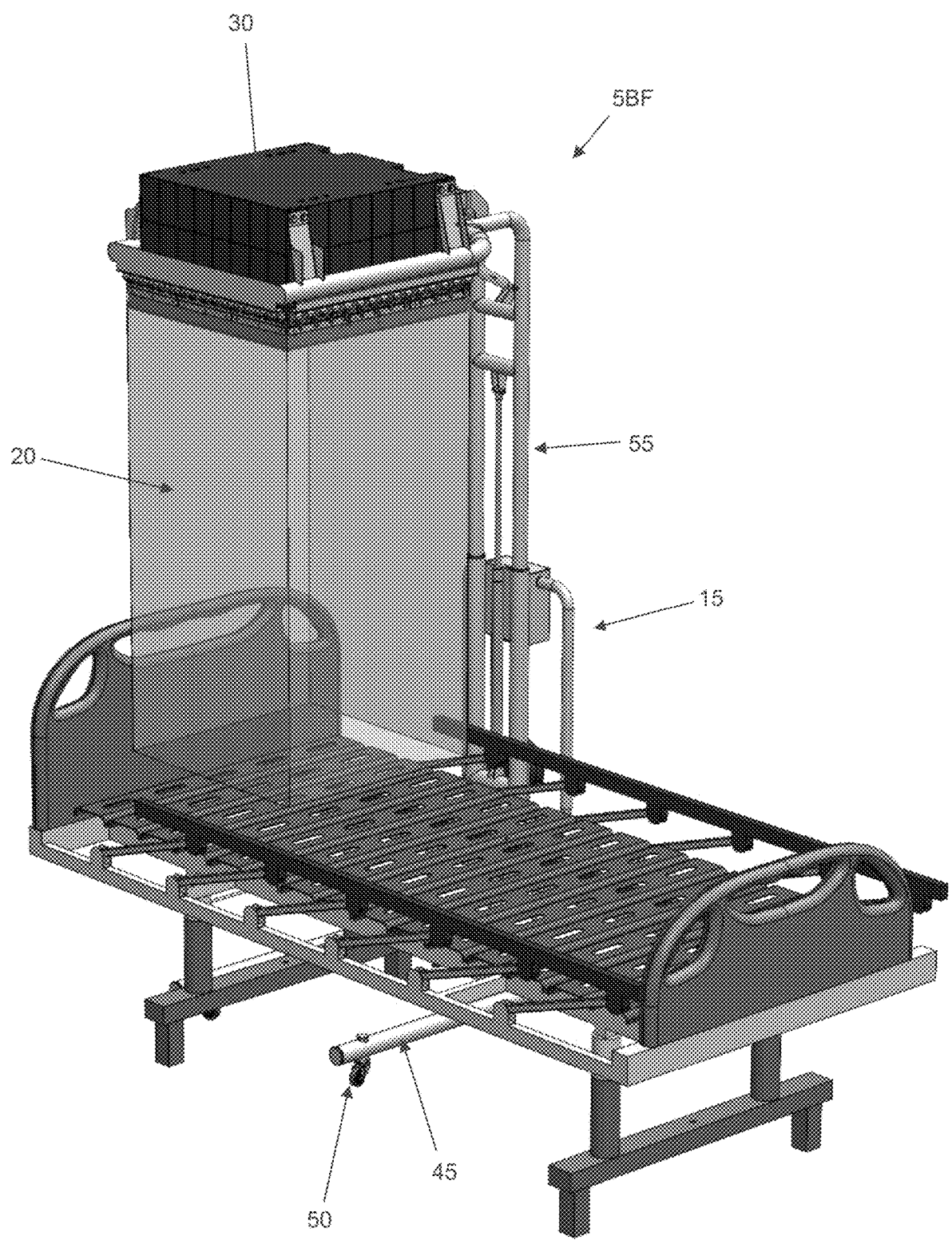
Figure 9I:
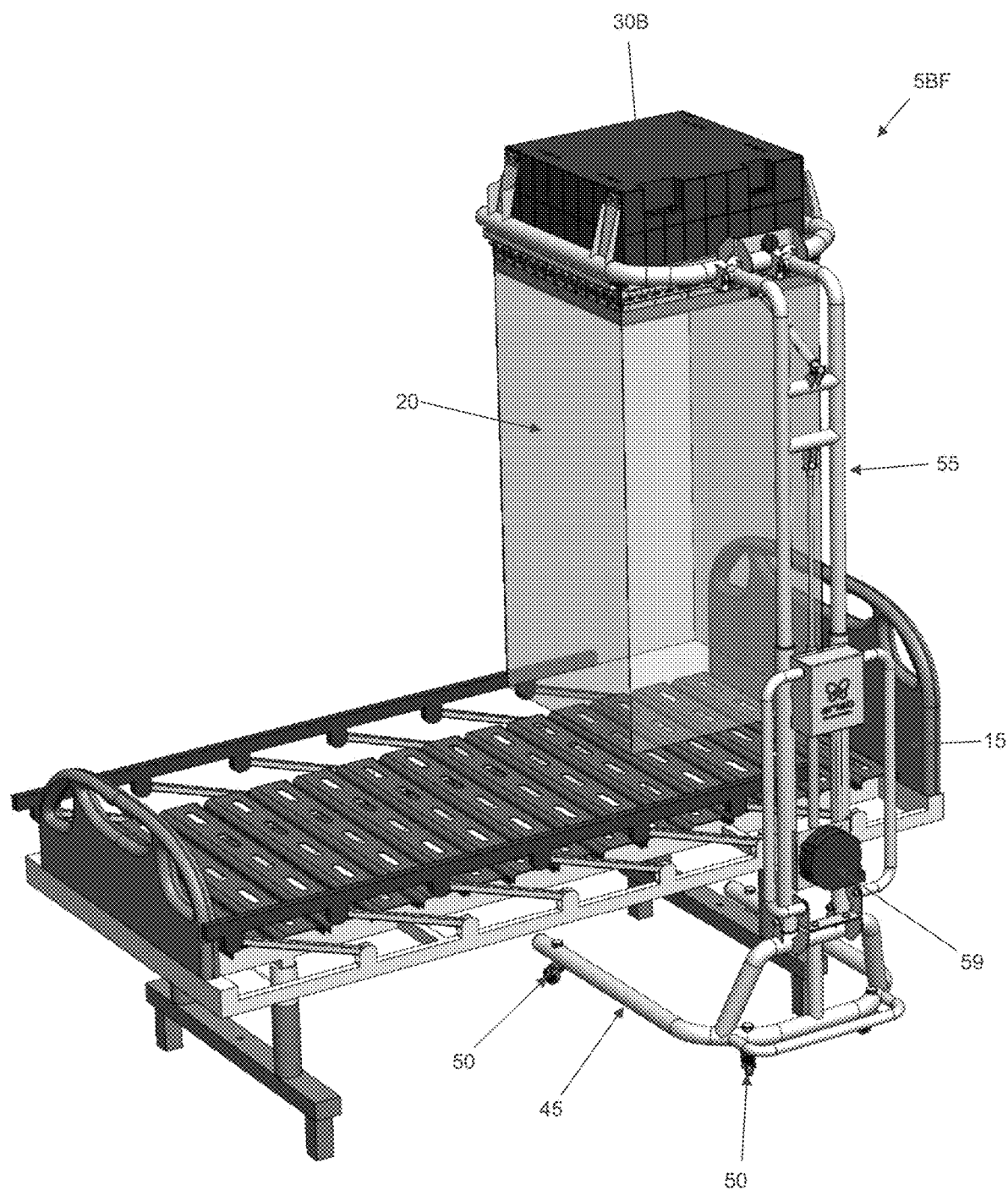
Figure 10:
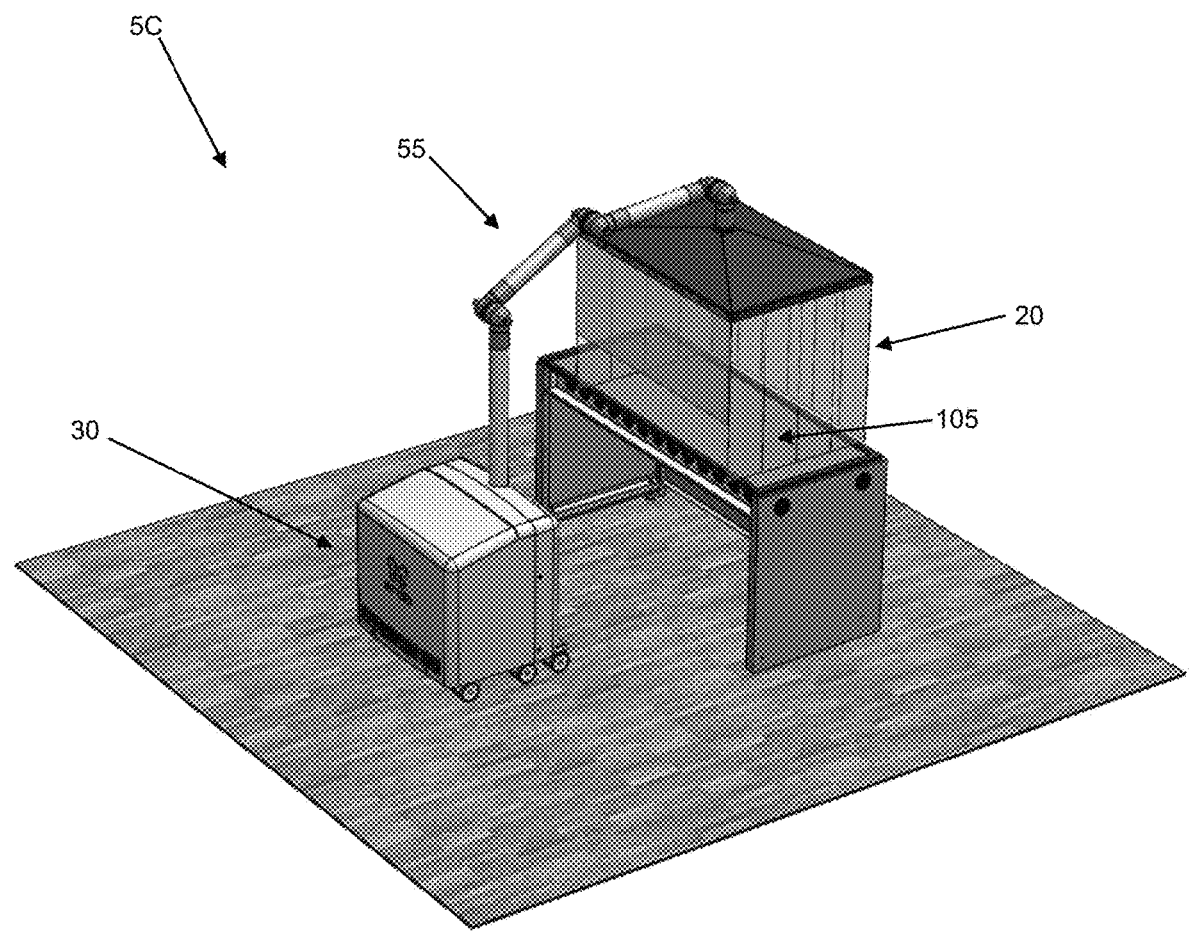
FIGS. 10-13 are schematic views showing a novel "wheeled" mobile air-filtering laboratory isolation system formed in accordance with the present invention.
Figure 11:
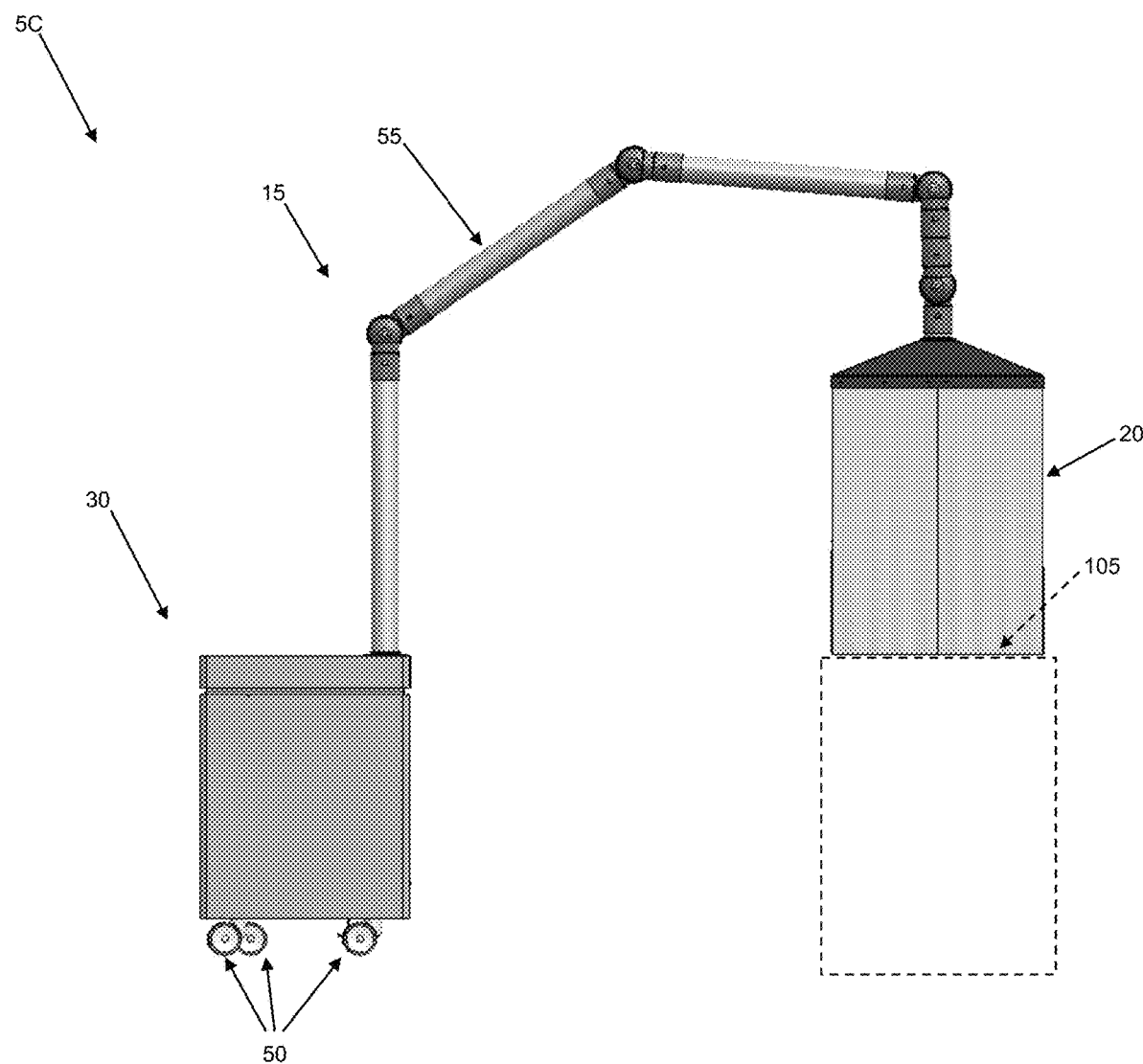
Figure 12:
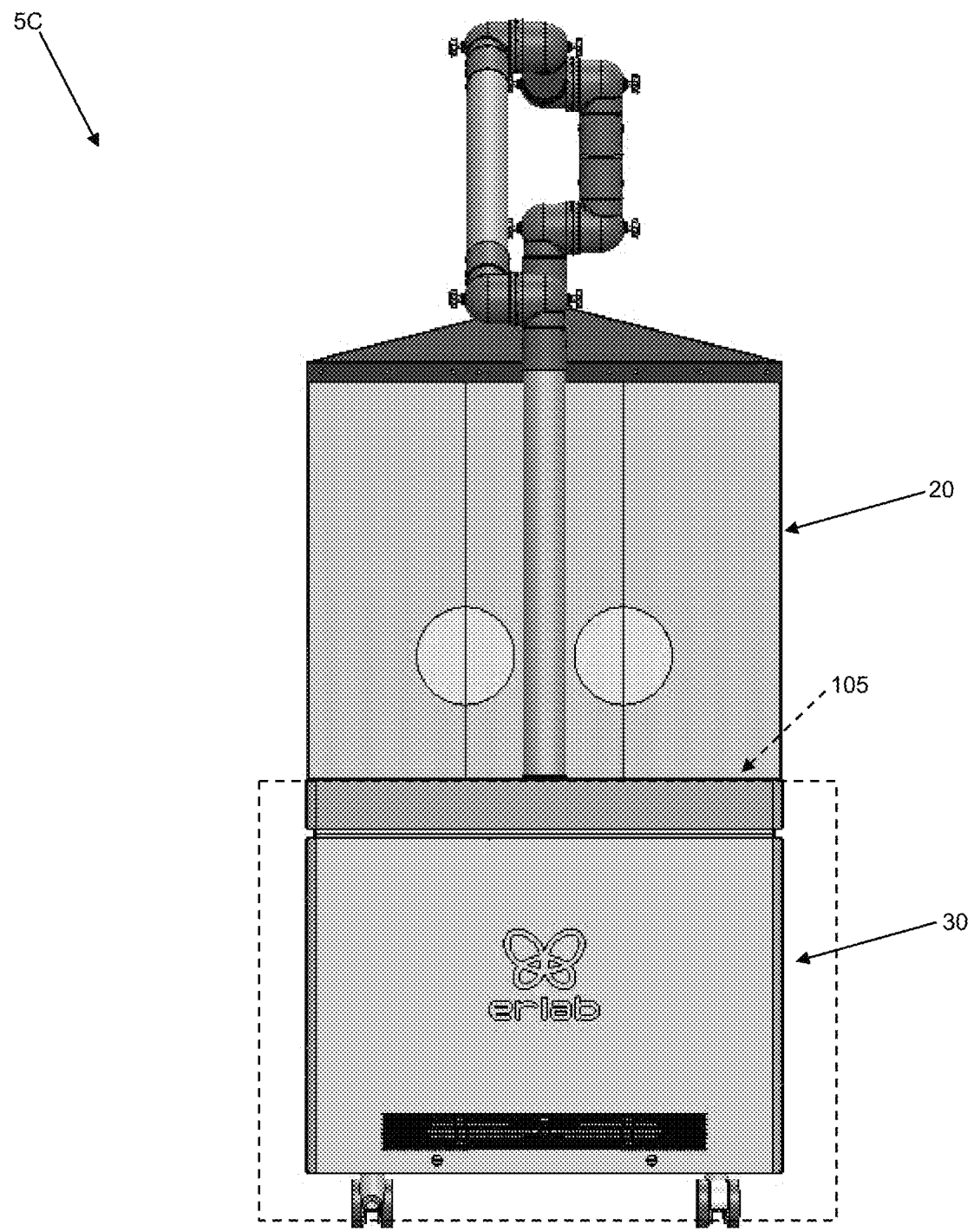
Figure 13:
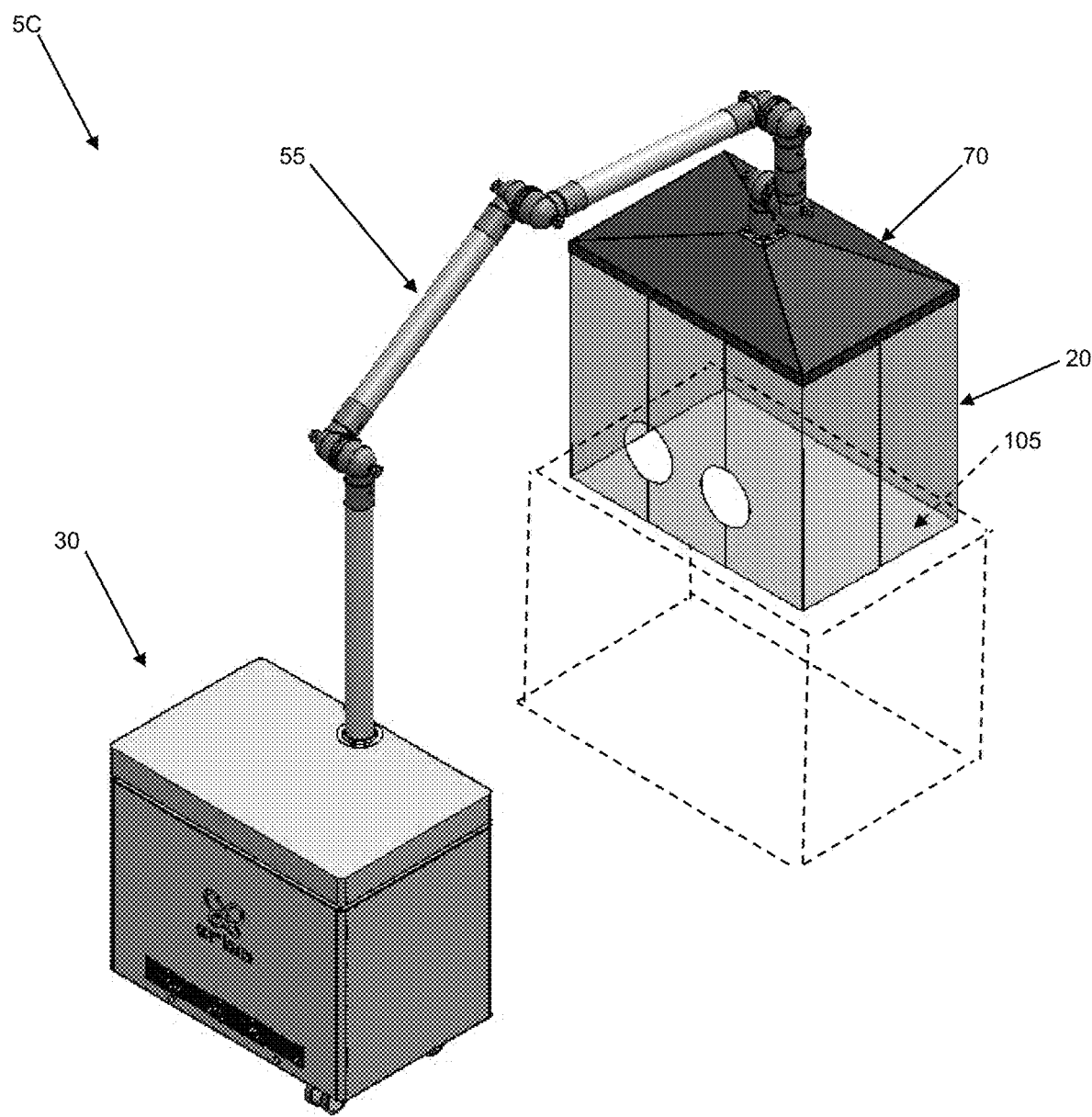
Figure 14:
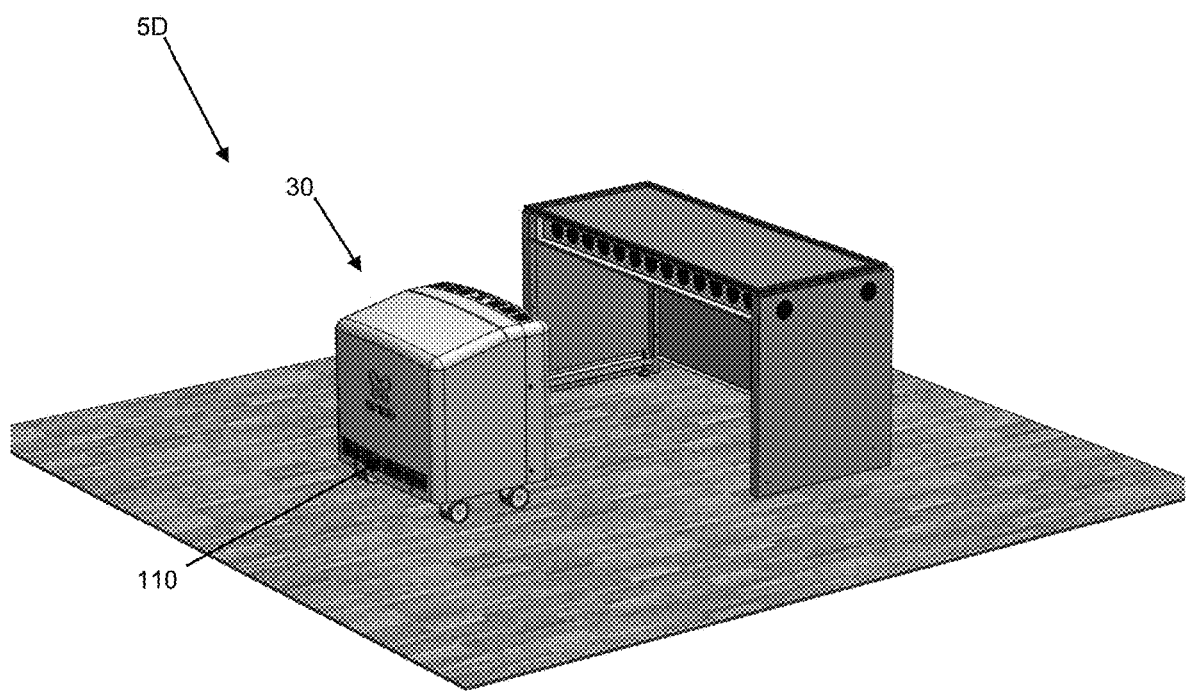
FIGS. 14-17 are schematic views showing a novel "wheeled" mobile air-filtering system formed in accordance with the present invention.
Figure 15:
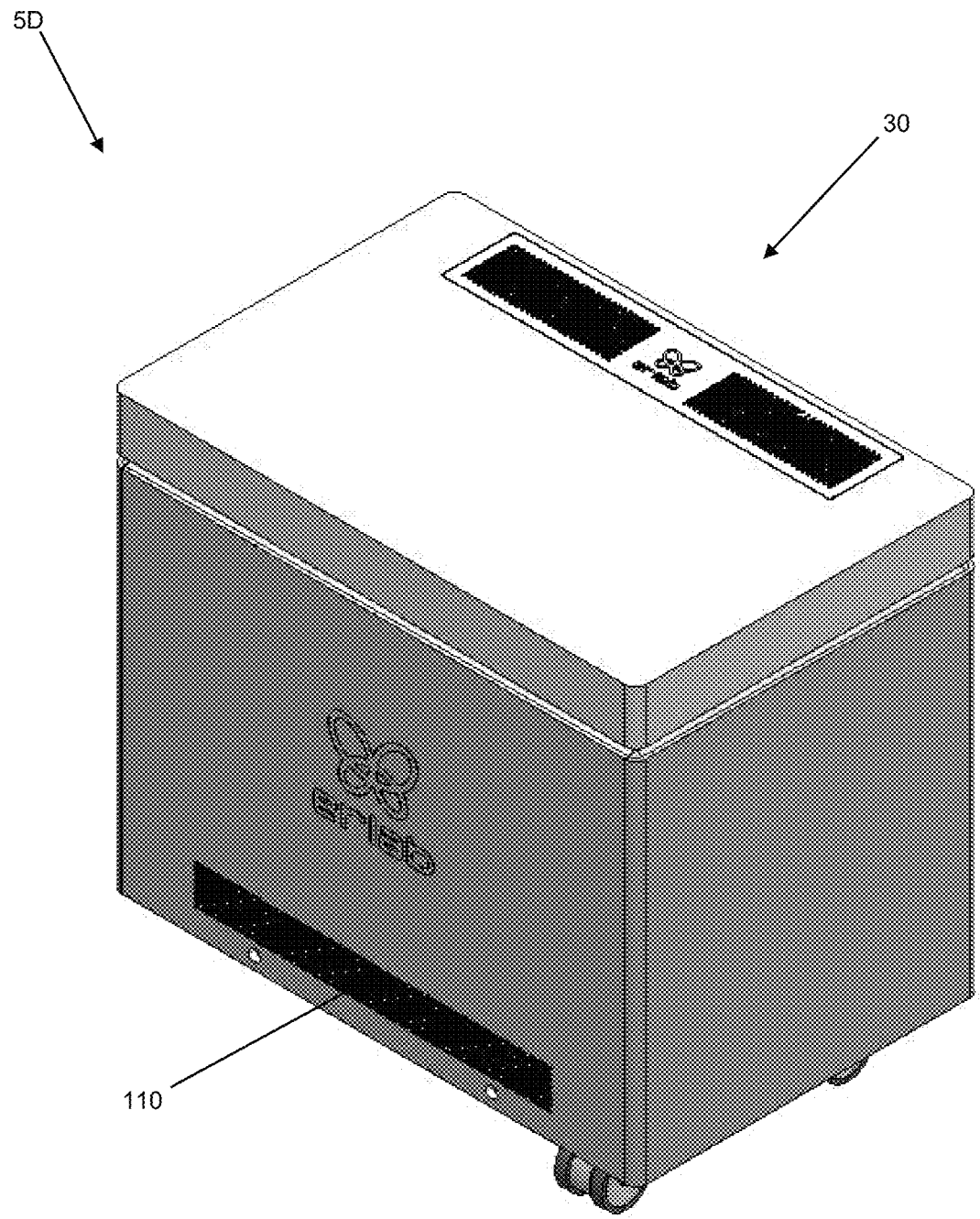
Figure 16:
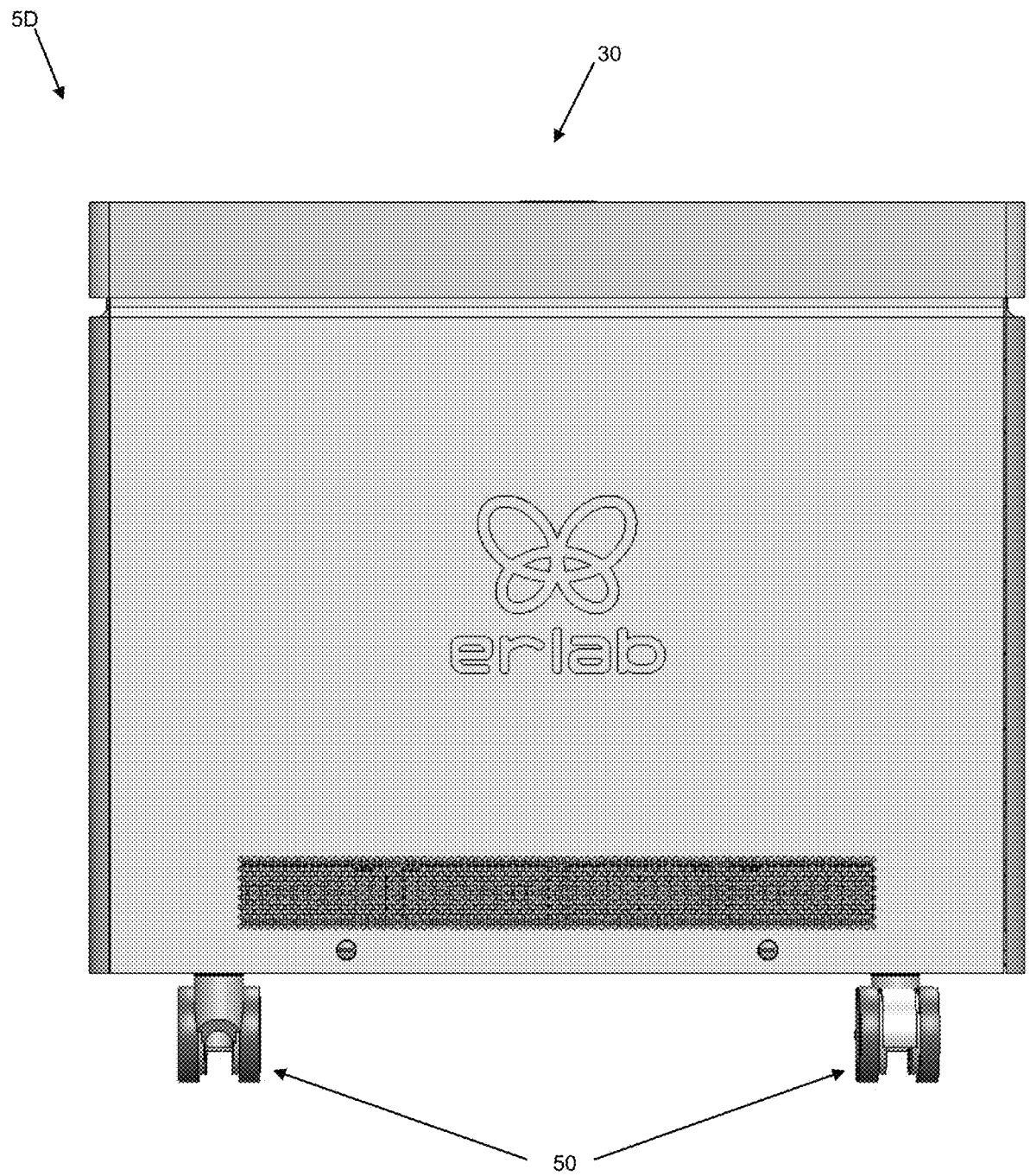
Figure 17:
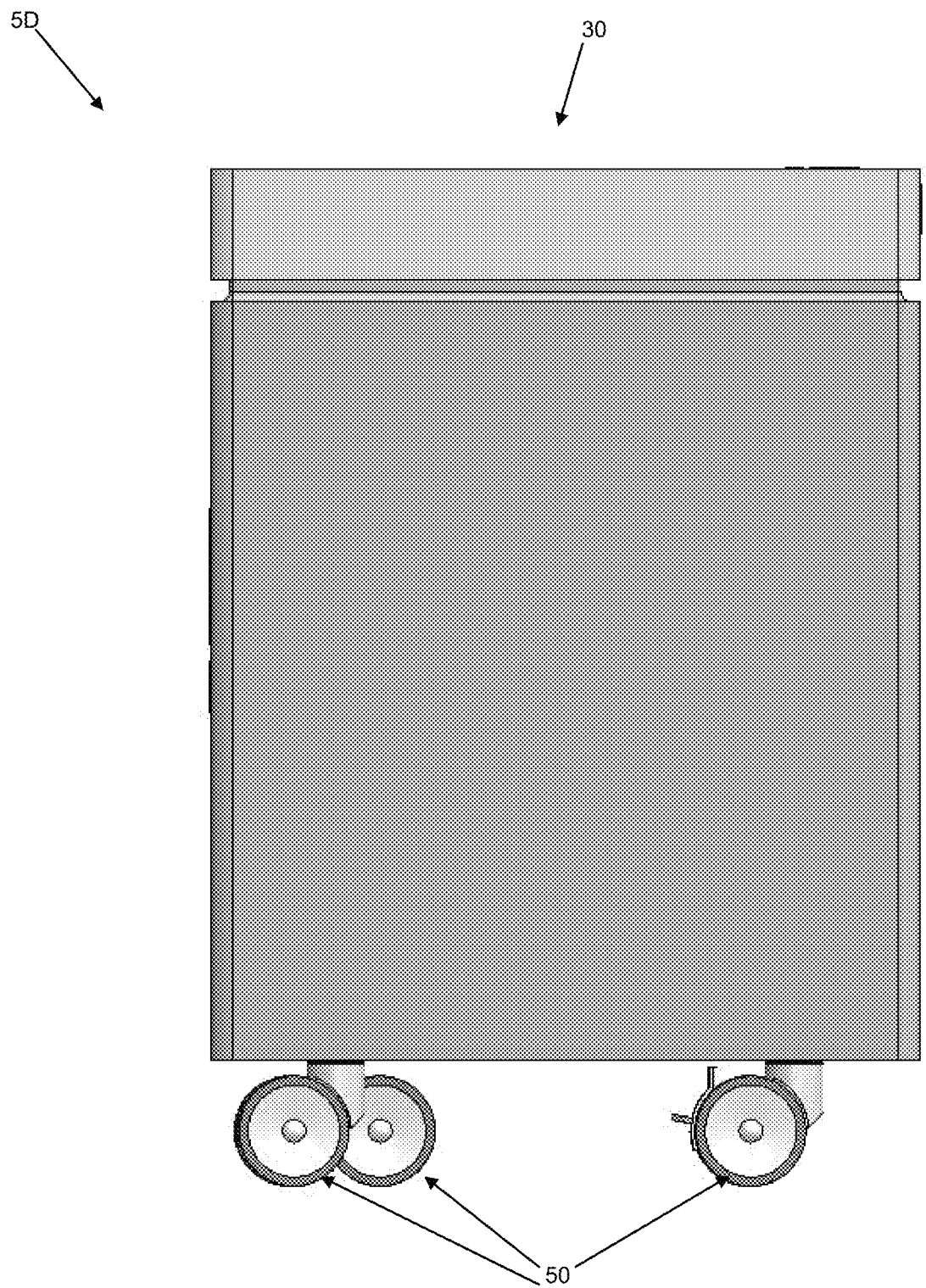

If desired, and looking now at FIG. 9E, "rolling" and "foldable" mobile air filtering patient isolation system 5BF may comprise a battery 58 for providing electrical power to operate air filtration unit 30. More particularly, if desired, a battery 58 may be mounted to one or more legs 45 of base 40 and electrically connected to air filtration unit 30 (e.g., via cabling extending through vertical riser 55, or via other cabling that will be apparent to one of ordinary skill in the art in view of the present disclosure). Significantly, mounting battery 58 to one or more legs 45 of base 40 provides a counterweight to add additional stability to system 5BF.

In one preferred form of the invention, system 5BF further comprises a retractable electrical cable connection 59 for connecting system 5 to an external power source (e.g., a wall outlet) to power air filtration unit 30 and/or to charge battery 58.

"Rolling" and "foldable" mobile air filtering patient isolation system 5BF may be used as follows. Base 40 may be pivoted from its collapsed (storage) position to its upright position so as to position wheels 50 on the floor. System 5BF may be rolled on its wheels 50 to position system 5BF adjacent to a patient's bed. Top frame 65 (and air filtration unit 30) may then be pivoted from its collapsed (storage) position to its upright position, and vertical riser 55 may be vertically adjusted so as to position air filtration unit 30 over the head and torso of a patient. Flexible transparent curtains 20 may then be attached to air filtration unit 30 so as to form the enclosure 25 about the head and torso of the patient. Then air filtration unit 30 is activated so as to withdraw air from within enclosure 25 and purify that air via filter 80 before returning the purified air to the room. Note that during operation of system 5BF, system 5BF essentially creates a "personalized negative pressure chamber" about the head and torso of the patient at their bedside, while the patient remains on their bed. As a result, medical personnel, other patients, etc. can be isolated against the patient within enclosure 25, as well as protected against certain medications which might be present in enclosure 25. When system 5BF is no longer needed in its upright position, system 5BF can be returned to its collapsed position and placed in storage (e.g., a closet, a vehicle, etc.)

1.11 "Bed-Mounted", "Wall-Mounted" or "Free-Standing Air Filtering Patient Isolation System In the foregoing description, system 5 comprises a mobile cart 10 and wheels 50 for rendering system 5 mobile, system 5A comprises wheels 50 for rendering system 5A mobile, system 5B comprises a mobile cart 10 and wheels 50 for rendering system 5B mobile, and system 5BF comprises a mobile cart 10 and wheels 50 for rendering system 5B mobile and a foldable frame for storing system 5BF. However, if desired, mobile cart 10 and wheels 50 may be omitted from system 5, and/or wheels 50 may be omitted from system 5A, and/or mobile cart 10 and wheels 50 may be omitted from system 5B, and/or mobile cart 10 and wheels 50 may be omitted from system 5BF, with systems 5, 5A, 5B and/or 5BF being provided as stationary systems. More particularly, frame 15 of systems 5, 5A, 5B and/or 5BF may be mounted to the frame of the patient's bed (i.e., systems 5, 5A, 5B and/or 5BF may be "bed-mounted"), or frame 15 of systems 5, 5A, 5B and/or 5BF may be mounted to a wall adjacent to the patient's bed (i.e., systems 5, 5A, 5B and/or 5BF may be "wall-mounted"), or frame 15 of systems 5, 5A, 5B and/or 5BF may be free-standing adjacent to the patient's bed (i.e., systems 5, 5A and/or 5B may be "free-standing" and system 5BF may be "free-standing" and "foldable").

2. Mobile Air-Filtering Laboratory Isolation System

In another form of the invention, and looking now at FIGS. 10-13, there is provided a new mobile air-filtering laboratory isolation system 5C. Mobile air-filtering laboratory isolation system 5C essentially creates a ductless fumehood about a benchtop 105.

Mobile air-filtering laboratory isolation system 5C is generally similar to the preceding "wheeled" mobile air filtering patient isolation system 5A, 5B or 5BF in form and function, except that:

(i) it is used to create an isolation zone about a benchtop 105; and
  (ii) its filter 80 is configured to treat the types of hazardous materials (e.g., noxious substances, chemicals, biologics, etc.) which may be used on the benchtop.

Thus, in this form of the invention, a molecular filter for treating certain chemicals (e.g., an acid filter, a base filter, etc.) may be used, or a HEPA or a ULPA filter (for protecting against certain biologics such as viruses and microorganisms) may be used. By way of example but not limitation, filter 80 may comprise a molecular filter of the sort available from Erlab (e.g., the Erlab BE+, BE, AS, F, K and/or G filter), a HEPA filter of the sort available from Erlab (e.g., the Erlab HEPA H14 High-Efficiency Particulate filter), or a multi-stage filter capable of simultaneously handling a multitude of different chemical families, e.g., solvents, acids and bases, such as Erlab's Neutrodine® filter.

Note that, if desired, it is also possible to deploy the aforementioned system 5 about a benchtop in order to form a mobile air-filtering laboratory isolation system, and/or to deploy the aforementioned system 5B about a benchtop in order to form a mobile air-filtering laboratory isolation system, and/or to deploy the aforementioned system 5BF about a benchtop in order to form a mobile (and "foldable") air-filtering laboratory isolation system.

2.1 "Benchtop-Mounted", "Wall-Mounted" or "Free-Standing Air Filtering Laboratory Isolation System In the foregoing descriptions, system 5C comprises wheels 50 attached to the bottom of air filtration unit 30 for rendering system 5C mobile, system 5 comprises a mobile cart 10 with wheels 50 for rendering system 5 mobile, system 5B comprises a mobile cart 10 with wheels 50 for rendering system 5B mobile, and system 5BF comprises a mobile cart 10 and wheels 50 for rendering system 5B mobile and a foldable frame for storing system 5BF. However, if desired, wheels 50 may be omitted from system 5C, and/or mobile cart 10 and wheels 50 may be omitted from system 5, and/or mobile cart 10 and wheels 50 may be omitted from system 5B, and/or mobile cart 10 and wheels 50 may be omitted from system 5BF, with systems 5C, 5, 5B and/or 5BF being provided as stationary systems. More particularly, air filtration unit 30 of system 5C, and/or frame 15 of systems 5, 5B and/or 5BF, may be mounted to the frame of the benchtop (i.e., systems 5C and/or 5 and/or 5B and/or 5BF may be "benchtop-mounted"), or air filtration unit 30 of system 5C, and/or frame 15 of systems 5, 5B and/or 5BF may be mounted to a wall adjacent to the benchtop (i.e., systems 5C and/or 5 and/or 5B and/or 5BF may be "wall-mounted"), or air filtration unit 30 of system 5C, and/or frame 15 of systems 5, 5B and/or 5BF may be free-standing adjacent to the benchtop (i.e., systems 5C and/or 5 and/or 5B may be "free-standing" and system 5BF may be "free-standing" and "foldable").

3. Mobile Room Air-Filtering System

In one form of the invention, and looking now at FIGS. 14-17, there is provided a new mobile room air-filtering system 5D. Mobile room air-filtering system 5D essentially comprises the wheeled air filtration unit 30 of FIGS. 7-9, 9A-9D, 9E-91 and/or 10-13, with the input orifice 110 of wheeled air filtration unit 30 being open to the room air.

In the preferred method of use, mobile room air-filtering system 5D is wheeled into a room and then turned on so that it cycles room air through filter 80 before returning the filtered air back into the room. In this form of the invention, filter 80 is configured according to the desired function, e.g., where room air-filtering system is to be used to protect against viruses (e.g., the SARS-CoV-2 virus), microorganisms and other biologics, filter 80 may comprise a HEPA or ULPA filter of the sort available from Erlab (e.g., the Erlab HEPA H14 High-Efficiency Particulate filter); or where room air-filtering system 5D is to be used to protect against certain chemicals, filter 80 may comprise a molecular filter of the sort available from Erlab (e.g., the Erlab BE+, BE, AS, F, K and/or G filter) or a multi-stage filter capable of simultaneously handling a multitude of different chemical families, e.g., solvents, acids and bases, such as Erlab's Neutrodine® filter.

3.1 "Ceiling-Mounted", "Wall-Mounted" or "Free-Standing Room Air Filtering System In the foregoing descriptions, system 5D comprises wheels 50 attached to the bottom of air filtration unit 30 for rendering system 5D mobile. However, if desired, wheels 50 may be omitted from system 5D. In this case, system 5D may be mounted to a ceiling (i.e., system 5D may be "ceiling-mounted"), or system 5D may be mounted to a wall (i.e., system 5D may be "wall-mounted"), or system 5D may be free-standing (i.e., system 5D may be "free-standing").

4. Improved Air Filtration Unit

In one form of the invention, there is provided an improved air filtration unit of increased effectiveness for protecting people against the SARS-CoV-2 virus and other hazardous viruses, microorganisms, etc. This improved air filtration unit is configured for use in air-filtering patient isolation systems such as the systems 5, 5A, 5B and 5BF discussed above, air-filtering laboratory isolation systems such as the system 5C discussed above, room air-filtering systems such as the system 5D discussed above, and other air-filtering systems.

More particularly, HEPA and ULPA filters such as discussed above in connection with air filtration unit 30, and as used in many air filtration applications, are highly effective in trapping particulates, viruses, microorganisms, etc. However, with respect to viruses and microorganisms, these HEPA and ULPA filters do not actually destroy the viruses and microorganisms, they merely collect the viruses and microorganisms on the front surface of the HEPA or ULPA filter. As a result, the viruses and microorganisms can linger on the front surface of the filter, thereby presenting a risk of contaminating an area if air pressure is not continuously applied to the HEPA or ULPA filter so as to keep the viruses and microorganisms in engagement with the front surface of the HEPA or ULPA filter. Thus, if suction fan 75 of air filtration unit 30 were to fail (e.g., due to a power failure), the viruses and microorganisms previously captured against the front surface of the fan by the air pressure produced by suction fan 75 could be freed from the front surface of the HEPA or ULPA filter and could contaminate the area around air filtration unit 30. Furthermore, viruses and microorganisms lingering on the front surface of the HEPA or ULPA filter can present a danger to maintenance personnel when they are replacing a used HEPA or ULPA filter with a fresh HEPA or ULPA filter.

It is known that UltraViolet (UV) radiation can destroy viruses and microorganisms in air. As a result, efforts have been made to irradiate air with UV radiation in an effort to kill viruses and microorganisms in the air. However, it has been found that effective UV treatment requires that the viruses and microorganism be exposed to UV radiation for a substantial period of time. As a result, the air to be treated must either be (i) held stationary in a chamber a lengthy period of time while it is treated with an adequate UV dosage, or (ii) the moving air must be irradiated over a long length of travel in order to receive an adequate UV dosage. In some cases it is not practical to hold the air in a chamber for a lengthy period of time, and in other cases it is not practical to irradiate the air over a long length of travel. As a result, UV radiation has had limited success to date.

In accordance with the present invention, there is now provided an improved air filtration unit which combines a HEPA or ULPA filter with a UV light source to overcome problems associated with prior art air filtration units. This improved air filtration unit is configured for use in air-filtering patient isolation systems such as the systems 5, 5A, 5B and 5BF discussed above, air-filtering laboratory isolation systems such as the system 5C discussed above, room air-filtering systems such as the system 5D discussed above, and other air-filtering systems.

Figure 18:
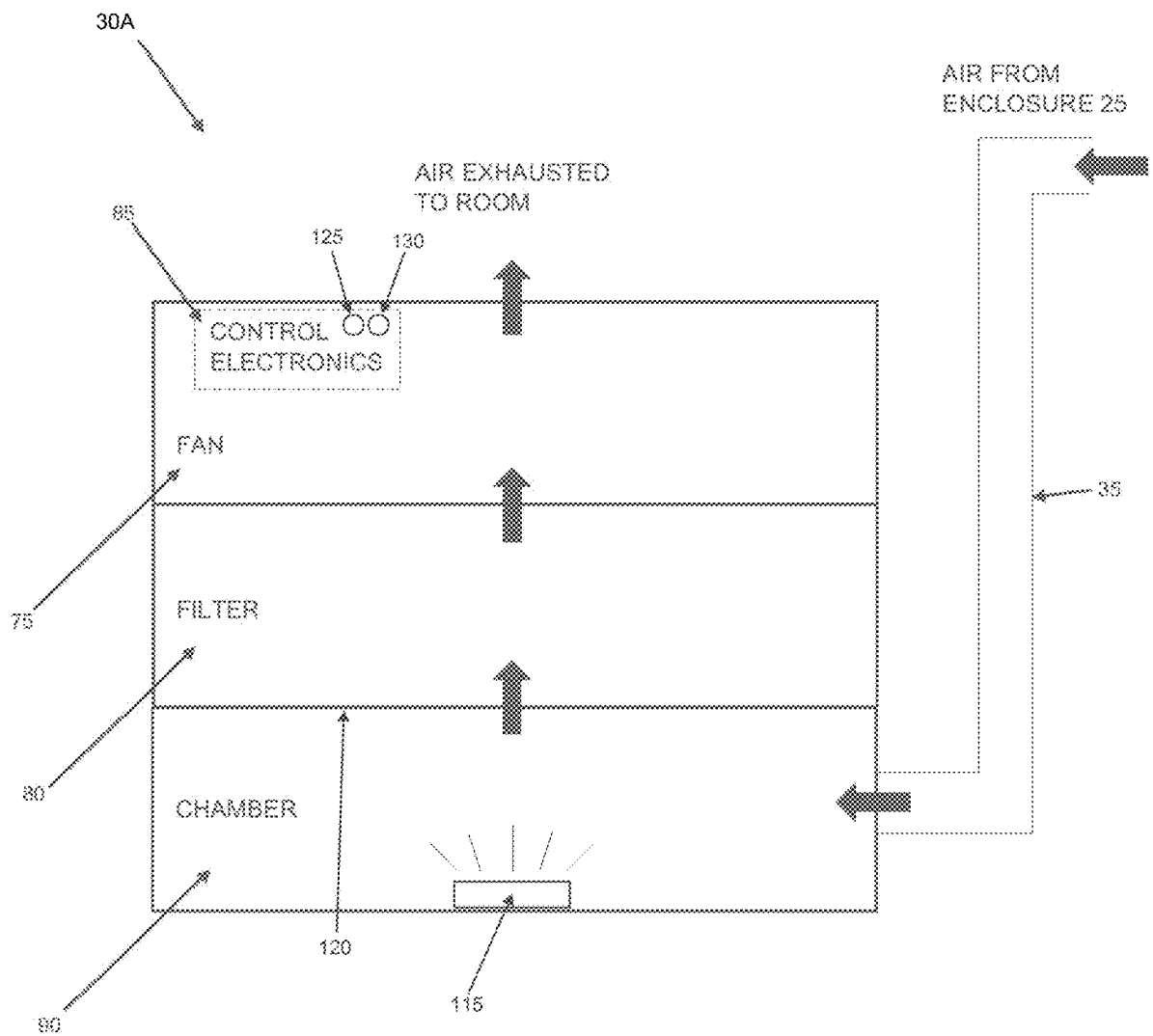
FIG. 18 is a schematic view showing aspects of another novel air filtration unit formed in accordance with the present invention.

Looking next at FIG. 18, there is shown in improved air filtration unit 30A formed in accordance with the present invention. Air filtration unit 30A is generally similar to the air filtration unit 30 discussed previously, except that it includes a UV radiation source 115 which has its UV radiation directed at the front surface of HEPA or ULPA filter 80. In one form of the invention, UV radiation source 115 emits UV radiation at a wavelength of 264 nm. As a result of this construction, when suction fan 75 pulls air through HEPA or ULPA filter 80, viruses and microorganisms in the air are captured on the front surface 120 of the HEPA or ULPA filter and held there due the air pressure provided by suction fan 75. UV radiation from UV radiation source 115 irradiates the viruses and microorganisms held to the front surface of the HEPA or ULPA filter by the action of suction fan 75 and, since the viruses and microorganisms are held there for substantial periods of time, the viruses and microorganisms are rendered harmless by the UV radiation from UV radiation source 115.

Thus, with this new approach, a HEPA or ULPA filter and UV radiation are combined in a symbiotic manner so that the benefits of the HEPA or ULPA filter (effective capture but no disinfecting) and UV radiation (effective disinfecting but required prolonged exposure) are obtained without suffering from their individual disadvantages: the HEPA or ULPA filter traps the viruses and microorganisms on the front surface of the filter and holds them there while the UV radiation from UV radiation source has time to render the viruses and microorganisms harmless. In essence, the HEPA for ULPA filter captures and holds the viruses and microorganisms in place while the effective but slow-acting UV radiation renders the viruses and microorganisms harmless. Thus, the HEPA or ULPA filter and the UV radiation source act together, in a cooperative manner, so as to achieve an improved result that neither of the components can achieve individually on its own.

It will be appreciated that the improved air filtration unit 30A of the present invention may be used in air-filtering patient isolation systems such as the systems 5, 5A, 5B and 5BF discussed above, air-filtering laboratory isolation systems such as the system 5C discussed above, room air-filtering systems such as the system 5D discussed above, and other air-filtering systems.

If desired, the improved air filtration system 30A may also include (i) sensors 125 to detect particles in the air, since viruses and microorganisms tend to attach themselves to particles, and/or (ii) sensors 130 to detect volatile organic compounds (VOCs) in the air, and/or (iii) a carbon dioxide sensor for monitoring the amount of carbon dioxide in the air, whereby to determine if air filtration system 30A needs to be automatically turned on in order to increase air filtration in a room.

In one preferred form of the invention, air filtration system 30A includes one or more sensors for monitoring proper function of the operational elements of air filtration system 30A (e.g., suction fan 75 and filter 80, etc.), and these sensors are preferably connected (e.g., by wire or wireless communication) to a monitoring system for activating an alarm (e.g., an audible alarm and/or a visual, light-based alarm) in the event that proper function of the operational elements (e.g., suction fan 75 and filter 80, etc.) is interrupted.

Furthermore, if desired, filter 80 may include a timer for indicating when filter 80 needs to be replaced.

Method and Apparatus for Controlling Air Filtration Unit Using a Handheld Unit Having Scanning, Networking, Display and Input Capability In the preceding sections, there are disclosed novel mobile air-filtering patient isolation systems 5, 5A, 5B, 5BF, 5C, 5D utilizing an air filtration unit 30 or 30A for filtering an enclosed volume of air disposed above an object (e.g., a patient on a hospital bed, a lab bench, etc.) so as to remove harmful contaminants (e.g., viruses, microorganisms, chemicals, etc.) from the volume of air.

Figure 19:
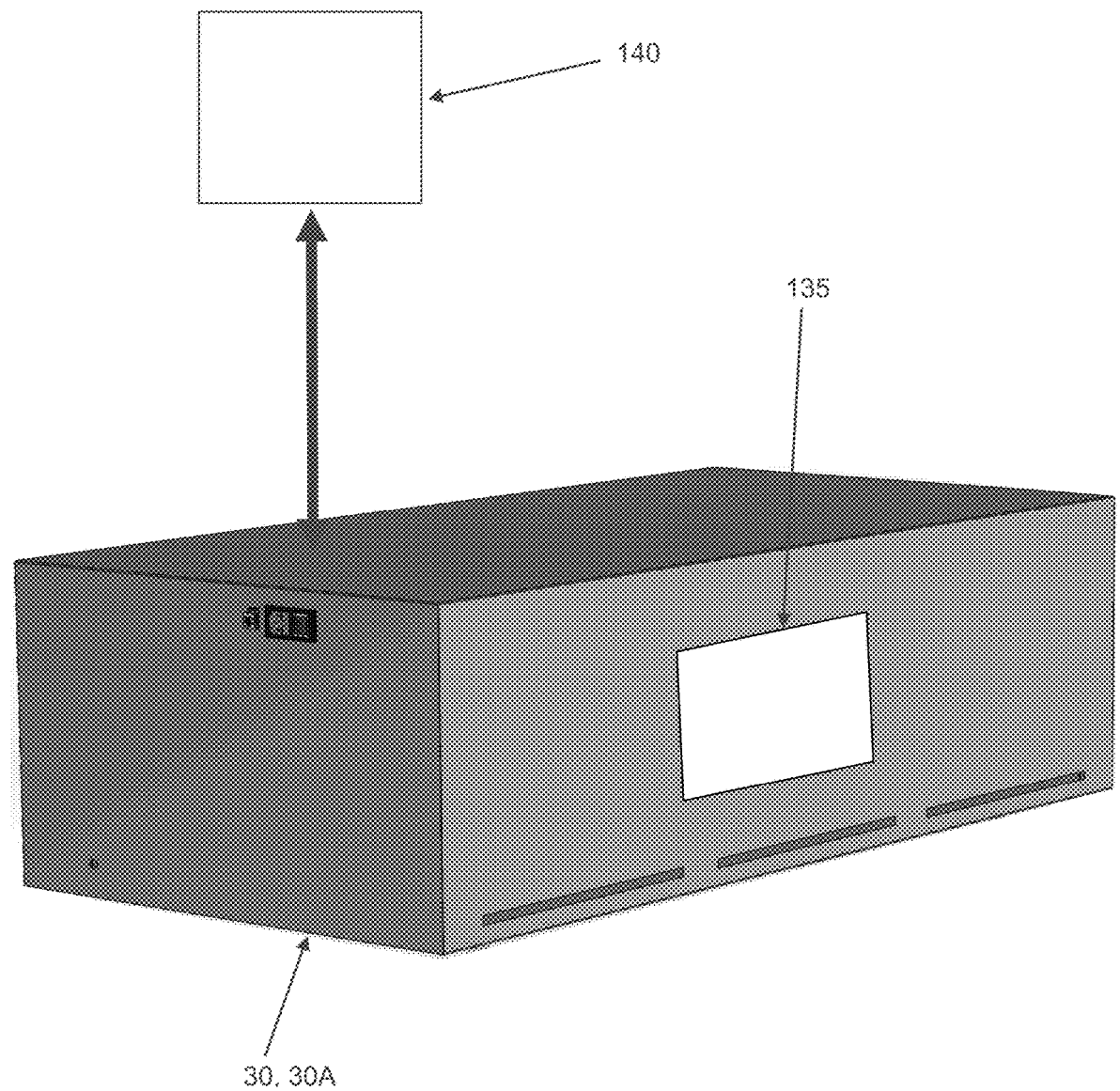
FIGS. 19 and 20 are schematic views showing systems for controlling an air filtration unit formed in accordance with the present invention.

In one form of the present invention, and looking now at FIG. 19, air filtration unit 30, 30A may comprise an on-board display screen 135 for displaying information relating to air filtration unit 30, 30A (e.g., the on/off status of suction fan 75, the high/medium/low operating speed of suction fan 75, the functional/non-functional status of filter 80, the remaining useful life of filter 80, etc.). On-board display screen 135 may be a "passive" display screen or, if desired, on-board display screen 135 may be a touchscreen display such that operational commands can be provided to air filtration unit 30, 30A via on-board display screen 135.

If desired, where air filtration unit 30, 30A is connected (by wire or wireless communication) to a monitoring and control system 140 (e.g., a central control monitoring and system located in the building or off-site), the monitoring and control system 140 may be used to monitor the status of air filtration unit 30, 30A and/or to provide operational commands to air filtration unit 30, 30A. By way of example but not limitation, air filtration unit 30, 30A may be connected (by wire or wireless communication) to a monitoring and control system 140 located within the building housing mobile air-filtering patient isolation systems 5, 5A, 5B, 5BF, 5C, 5D. By way of further example but not limitation, air filtration unit 30, 30A may be connected (by wire or wireless communication) to a monitoring and control system 140 located off-site, e.g., air filtration unit 30, 30A may be connected via the Internet to a monitoring and control system located thousands of miles away from novel air filtration unit 30, 30A (and mobile air-filtering patient isolation systems 5, 5A, 5B, 5BF, 5C, 5D).

In still another form of the present invention, a monitoring and control system 140 may be incorporated directly into air filtration unit 30, 30A. In this respect it will be appreciated that having monitoring and control system 140 within air filtration unit 30, 30A offers the advantage of having a complete standalone and autonomous working device which acts as its own web server platform embedded right into the working device's own central processing unit (not shown).

In connection with the foregoing, it should be appreciated that a plurality of air filtration units 30, 30A (located at one or more locations) may be connected to a single monitoring and control system (e.g., monitoring and control system 140 disposed within air filtration unit 30, 30A) or to multiple monitoring and control systems.

However, the provision of an on-board display screen 135 generally increases the cost of air filtration unit 30, 30A.

To address this, the present invention provides a new approach for controlling air filtration unit 30, 30A without requiring that air filtration unit 30, 30A have an on-board display screen. This is achieved by the provision and use of a novel system which enables the air filtration unit 30, 30A to be controlled using a handheld unit having scanning, networking, display and input capability.

In one preferred form of the present invention, air filtration unit 30, 30A is connected to a monitoring and control system (e.g., a central server) via the Internet, and air filtration unit 30, 30A is provided with a device-specific QR code. In this form of the invention, air filtration unit 30, 30A may omit an on-board display screen 135, and air filtration unit 30, 30A may be controlled using a handheld unit having scanning, networking, display and input capability.

Figure 20:
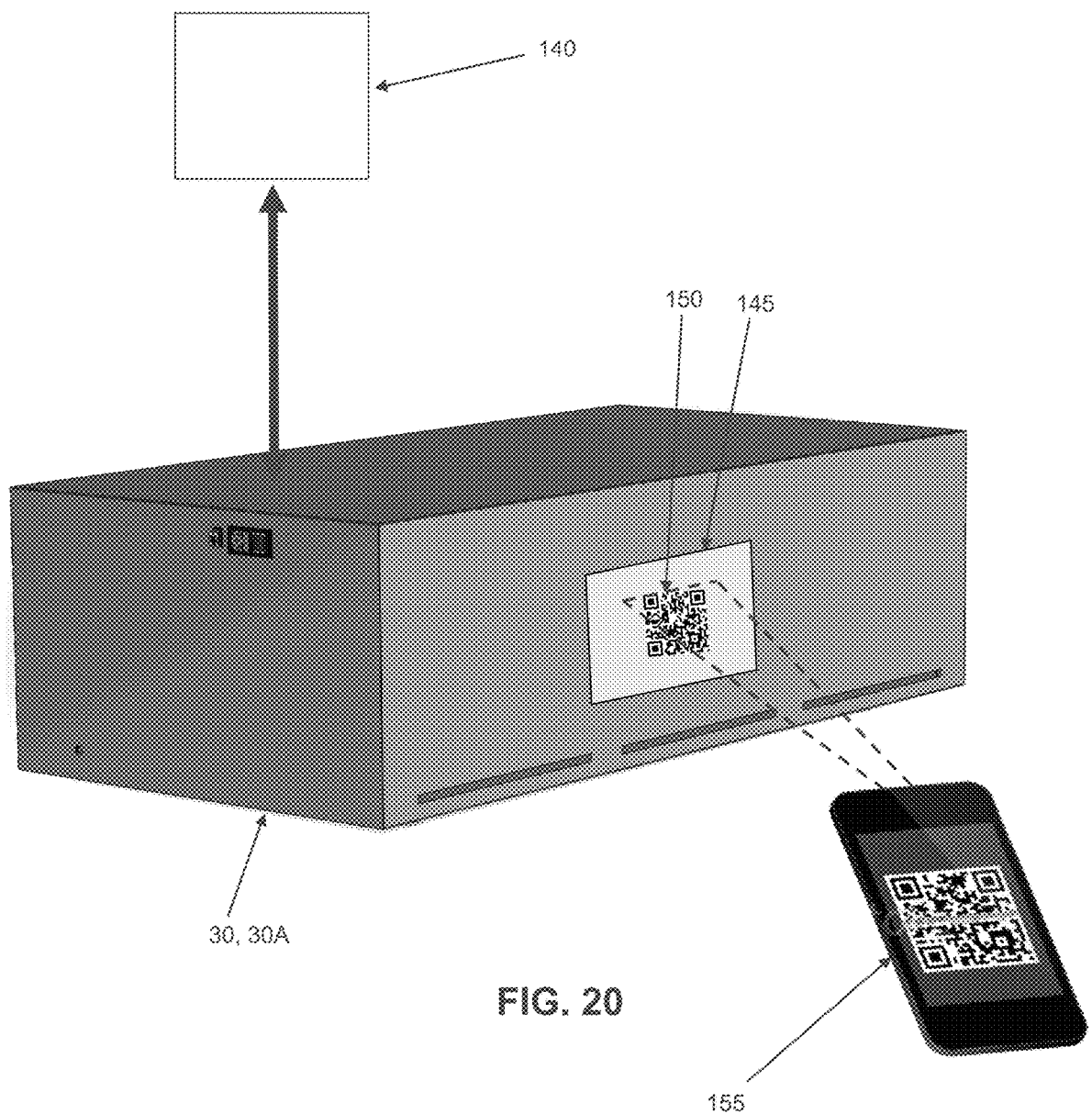

More particularly, in this form of the invention, and looking now at FIG. 20, air filtration unit 30, 30A is connected (e.g., by wire or wireless communication) to a monitoring and control system 140 (e.g., a central server) via the Internet, and air filtration unit 30, 30A is provided with a label 145 carrying a device-specific QR code 150 which is capable of being machine-read (e.g., scanned) by a handheld unit 155 having scanning, networking, display and input capability (e.g., a smartphone, a tablet, a smartwatch, smart glasses, a laptop, etc.). In this form of the invention, air filtration unit 30, 30A reports its operational status (e.g., the on/off status of suction fan 75, the high/medium/low operating speed of suction fan 75, the functional/non-functional status of filter 80, the remaining useful life of filter 80, etc.) to monitoring and control system 140 (e.g., a central server) via the Internet. Monitoring and control system 140 (e.g., a central server) can then monitor air filtration unit 30, 30A for proper function. Monitoring and control system 140 (e.g., a central server) can also provide operational commands to air filtration unit 30, 30A so as to control operation of air filtration unit 30, 30A. Furthermore, users can access monitoring and control system 140 (e.g., a central server) via a network such as the Internet in order to monitor the operational status of air filtration unit 30, 30A and/or to provide operational commands to air filtration unit 30, 30A.

Significantly, a user located adjacent to novel air filtration unit 30, 30A can obtain information relating to air filtration unit 30, 30A (e.g., the on/off status of suction fan 75, the high/medium/low operating speed of suction fan 75, the functional/non-functional status of filter 80, the remaining useful life of filter 80, etc.) even though novel air filtration unit 30, 30A lacks an on-board display screen. More particularly, in order to obtain information relating to a specific air filtration unit 30, 30A, the user can simply scan the device-specific QR code 150 associated with that specific novel air filtration unit 30, 30A using a handheld unit 155 having scanning, networking, display and input capability (e.g., a smartphone, a tablet, a smartwatch, smart glasses, a laptop, etc.). If desired, the handheld unit 155 can be configured (i.e., by appropriate software) to automatically open a web browser or other application or software for facilitating communication between handheld unit 155 and monitoring and control system 140 upon scanning of device-specific QR code 150. The device-specific QR code 150 assigned to that air filtration unit 30, 30A is then automatically transmitted by the handheld unit 155 to monitoring and control system 140 (e.g., the central server), which then pushes the operating information associated with the specific air filtration unit 30, 30A linked to that device-specific QR code (i.e., the operating information associated with that particular air filtration unit 30, 30A) back to the handheld unit. This operating information for air filtration unit 30, 30A is then displayed to the user on the display screen of handheld unit 155.

In addition, and significantly, once the device-specific QR code 150 for that particular air filtration unit 30, 30A has been used to establish a link between the handheld unit 155 and air filtration unit 30, 30A via monitoring and control system 140 (e.g., the central server), the handheld unit can then be used to provide operational commands to the air filtration unit 30, 30A (i.e., by sending operational commands from handheld unit 155 to monitoring and control system 140, which in turn relays those operational commands to the specific air filtration unit 30, 30A).

Thus it will be seen that, in this form of the invention, by linking the handheld unit 155 to a specific air filtration unit via the device-specific QR code for that particular air filtration unit, the display screen of a handheld unit 155 having scanning, networking, display and input capability (e.g., a smartphone, a tablet, a smartwatch, smart glasses, a laptop, etc.) effectively becomes the display screen for that air filtration unit 30, 30A. This allows on-board display screen 135 to be omitted from air filtration unit 30, 30A, which can result in substantial cost savings for the manufacturer.

It should be appreciated that inasmuch as air filtration unit 30, 30A may comprise monitoring and control system 140, it is possible to establish a wireless (e.g., WiFi, Bluetooth, etc.) direct peer-to-peer network between a handheld unit 155 and monitoring and control system 140. With this form of the invention, device-specific QR code 150 contains the relevant network connectivity data (e.g., IP address, local network address, etc.) that handheld unit 155 requires in order to connect to monitoring and control system 140. This form of the invention may be useful in situations in which the air filtration unit 30, 30A is not connected to the Internet (or to any other wireless network). When handheld unit 155 is directly connected to a monitoring and control system 140 embedded in a particular air filtration unit 30, 30A, it is possible to monitor and control operation of that particular air filtration unit 30, 30A in the manner discussed above using handheld unit 155.

Modifications

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A mobile and foldable air-filtering isolation system for isolating an object in a room, the system comprising:
   a base comprising at least one leg, the at least one leg comprising at least one wheel for rolling the base on the surface of the floor in the room;
   a frame extending upwardly from the base, the frame comprising (i) at least one vertical riser having a longitudinal axis, and (ii) a top support having a longitudinal axis;
   an air filtration unit mounted to the top support of the frame, wherein the air filtration unit comprises:
   an air inlet formed in the housing;
   an air outlet formed in the housing;
   a passageway extending through the housing and connecting the air inlet to the air outlet;
   a filter disposed in the passageway for purifying the air in the passageway;
   a suction fan disposed within the passageway for drawing air into the air inlet through the filter and out of the air outlet;
   a sensor for monitoring at least one of (i) the presence of chemicals in the room, (ii) the presence of biologics in the room, (iii) proper function of the air filtration unit, and (iv) the concentration of carbon dioxide in the room; and an ultraviolet (UV) light source for sterilizing the filter; wherein the air filtration unit is wirelessly connected to a monitoring and control system;

wherein the at least one vertical riser is configured to be selectively telescoped upwardly and downwardly so as to enable the height of the air filtration unit to be adjusted;

wherein the top support is hingedly mounted to the vertical riser such that the air filtration unit may be disposed in (i) a deployed position in which the longitudinal axis of the top support extends generally perpendicular to the longitudinal axis of the at least one vertical riser and parallel to the surface of the floor in the room, or (ii) a collapsed position in which the longitudinal axis of the top support extends generally parallel to the longitudinal axis of the at least one vertical riser;

wherein the base is hingedly mounted to the frame such that the base may be disposed in (i) a deployed position in which the at least one leg extends generally perpendicular to the longitudinal axis of the at least one vertical riser and parallel to the surface of the floor in the room, or (ii) a collapsed position in which the at least one leg extends generally parallel to the longitudinal axis of the at least one vertical riser;

at least one curtain configured to be mounted to the air filtration unit when the air filtration unit is in the deployed configuration, such that when the air filtration unit is in the deployed configuration and the at least one curtain is mounted to the air filtration unit, the air filtration unit and the at least one curtain together form an enclosure around the object to be isolated in the room; and a storage container for storing the at least one curtain; wherein the air filtration unit is configured to (i) withdraw air from at least one of the enclosure and the room, (ii) filter the withdrawn air, and (iii) return the filtered air to the room or the enclosure; and further wherein the air filtration unit is configured to (i) withdraw air from at least one of the enclosure and the room, (ii) purify the withdrawn air by capturing at least one of viruses and microorganisms to the filter, (iii) activate the UV light source to irradiate the viruses and microorganisms captured on the filter, whereby to sterilize the filter, and (iv) return the purified air to the room or the enclosure.

2. The system of claim 1 wherein the at least one curtain is flexible.

3. The system of claim 1 wherein the filter is configured to trap at least one selected from the group consisting of chemicals, viruses, microorganisms, medications, vapor droplets and particulates.

4. The system of claim 1 further comprising a battery for powering the air filtration unit.

5. The air filtration unit of claim 1 wherein the sensor is further configured to monitor proper function of at least one of the suction fan and the filter.

6. The system of claim 1 wherein the filter comprises at least one from the group consisting of a High-Efficiency Particulate Air ("HEPA") filter, an Ultra Low Particulate Air ("ULPA") filter and a molecular filter.

7. A method for isolating an object in a room, the method comprising:

providing a mobile and foldable air-filtering isolation system for isolating the object in the room, the system comprising:

a base comprising at least one leg, the at least one leg comprising at least one wheel for rolling the base on the surface of the floor in the room;

a frame extending upwardly from the base, the frame comprising (i) at least one vertical riser having a longitudinal axis, and (ii) a top support having a longitudinal axis;

an air filtration unit mounted to the top support of the frame, wherein the air filtration unit comprises:

an air inlet formed in the housing;

an air outlet formed in the housing;

a passageway extending through the housing and connecting the air inlet to the air outlet;

a filter disposed in the passageway for purifying the air in the passageway;

a suction fan disposed within the passageway for drawing air into the air inlet through the filter and out of the air outlet;

a sensor for monitoring at least one of (i) the presence of chemicals in the room, (ii) the presence of biologics in the room, (iii) proper function of the air filtration unit, and (iv) the concentration of carbon dioxide in the room; and an ultraviolet (UV) light source for sterilizing the filter;

wherein the air filtration unit is wirelessly connected to a monitoring and control system;

wherein the at least one vertical riser is configured to be selectively telescoped upwardly and downwardly so as to enable the height of the air filtration unit to be adjusted;

wherein the top support is hingedly mounted to the vertical riser such that the air filtration unit may be disposed in (i) a deployed position in which the longitudinal axis of the top support extends generally perpendicular to the longitudinal axis of the at least one vertical riser and parallel to the surface of the floor in the room, or (ii) a collapsed position in which the longitudinal axis of the top support extends generally parallel to the longitudinal axis of the at least one vertical riser;

wherein the base is hingedly mounted to the frame such that the base may be disposed in (i) a deployed position in which the at least one leg extends generally perpendicular to the longitudinal axis of the at least one vertical riser and parallel to the surface of the floor in the room, or (ii) a collapsed position in which the at least one leg extends generally parallel to the longitudinal axis of the at least one vertical riser;

at least one curtain configured to be mounted to the air filtration unit when the air filtration unit is in the deployed configuration, such that when the air filtration unit is in the deployed configuration and the at least one curtain is mounted to the air filtration unit, the air filtration unit and the at least one curtain together form an enclosure around the object to be isolated in the room;

a storage container for storing the at least one curtain; positioning the enclosure around the object to be isolated in the room; and operating the air filtration unit so as to either (i) withdraw air from the enclosure into the air filtration unit, purify the withdrawn air and return the purified air to the room, (ii) withdraw air from the room into the air filtration unit, purify the withdrawn air and return the purified air to the enclosure, or (iii) withdraw air from at least one of the enclosure and the room, purify the withdrawn air by capturing at least one of viruses and microorganisms to the filter, activate the UV light source to irradiate the viruses and microorganisms captured on the filter, whereby to sterilize the filter, and return the purified air to the room or the enclosure.

8. The method of claim 7 wherein the object is a hospital bed and a patient is on the hospital bed.

9. The method of claim 8 further comprising delivering a medication to the patient while operating the air filtration unit.

10. The method of claim 7 wherein positioning the enclosure around the object to be isolated in the room comprises moving the top support to the deployed position and mounting the at least one curtain to the air filtration unit.

11. The method of claim 10 wherein the at least one curtain is removably fastened to the air filtration unit.

12. The method of claim 10 wherein after operating the air filtration unit, the method further comprises removing the at least one curtain from the air filtration unit, moving the top support to the collapsed position, moving the base to the collapsed position, and storing the system.

13. The method of claim 7 wherein the filter is further configured to capture at least one selected from the group consisting of chemicals, medications, vapor droplets and particulates.

14. The method of claim 7 further comprising modifying the operation of the air filtration unit to account for at least of (i) the presence of chemicals in the room, (ii) the presence of biologics in the room, and (iii) the concentration of carbon dioxide in the room.

15. The method of claim 7 wherein the filter comprises at least one from the group consisting of a High-Efficiency Particulate Air ("HEPA") filter, an Ultra Low Particulate Air ("ULPA") filter and a molecular filter.

* * * * *